(12) United States Patent
Shoge et al.

(10) Patent No.: US 8,376,897 B2
(45) Date of Patent: Feb. 19, 2013

(54) INTERNALLY GEARED HUB FOR BICYCLE

(75) Inventors: Akihiko Shoge, Osaka (JP); Tatsushi Okamoto, Osaka (JP); Naoto Migita, Osaka (JP)

(73) Assignee: Shimano Inc., Osaka (JP)

( * ) Notice: Subject to any disclaimer, the term of this patent is extended or adjusted under 35 U.S.C. 154(b) by 602 days.

(21) Appl. No.: 12/624,895

(22) Filed: Nov. 24, 2009

(65) Prior Publication Data
US 2011/0009231 A1 Jan. 13, 2011

(30) Foreign Application Priority Data
Jul. 10, 2009 (JP) .................................. 2009-163394

(51) Int. Cl.
*F16H 3/44* (2006.01)
(52) U.S. Cl. ......................................................... 475/284
(58) Field of Classification Search .................. 475/330, 475/329, 296, 298, 269, 270
See application file for complete search history.

(56) References Cited

U.S. PATENT DOCUMENTS

| 6,387,008 | B1 * | 5/2002 | Chen et al. ..................... 475/296 |
| 7,670,251 | B2 * | 3/2010 | Okochi .......................... 475/297 |
| 7,967,718 | B2 * | 6/2011 | Hino ............................... 475/330 |
| 2002/0137590 | A1 * | 9/2002 | Shoge .......................... 475/278 |
| 2005/0252750 | A1 | 11/2005 | Matsueda et al. |
| 2007/0254768 | A1 * | 11/2007 | Okochi ........................ 475/298 |
| 2009/0005210 | A1 * | 1/2009 | Fukui et al. .................... 475/296 |

FOREIGN PATENT DOCUMENTS

| CN | 1696009 A | 11/2005 |
| JP | 2914909 B2 | 4/1999 |
| JP | 3157205 B2 | 2/2001 |
| JP | 3146138 U | 10/2008 |

* cited by examiner

*Primary Examiner* — David D Le
*Assistant Examiner* — David J Hlavka
(74) *Attorney, Agent, or Firm* — Global IP Counselors, LLP

(57) ABSTRACT

An internally geared hub is provided with a hub axle, a hub shell, a driver, a planetary gear mechanism and a gear changing mechanism. The hub shell rotates freely about the hub axle. The driver rotates freely relative to both the hub axle and the hub shell. The planetary gear mechanism is operatively connected between the hub shell and the driver. The planetary gear mechanism includes a plurality of driver rotation transmission paths that transmits rotation of the driver in a prescribed operating direction to the hub shell, and a hub shell rotation transmission path that transmits rotation of the hub shell in the prescribed operating direction to the driver. The gear changing mechanism is operatively connected the planetary gear mechanism for selectively establishing one of the driver rotation transmission paths or the hub shell rotation transmission path.

13 Claims, 14 Drawing Sheets

INTERNALLY GEARED HUB FOR BICYCLE

CROSS-REFERENCE TO RELATED APPLICATIONS

This application claims priority under 35 U.S.C. §119 to Japanese Patent Application No. 2009-163394, filed Jul. 10, 2009. The entire disclosure of Japanese Patent Application No. 2009-163394 is hereby incorporated herein by reference.

BACKGROUND OF THE INVENTION

1. Field of the Invention

This invention generally relates to a geared hub. More specifically, the present invention relates to an internally geared hub for a bicycle that is configured to be mounted on a rearward portion of a bicycle frame and used as a rear wheel hub.

2. Background Information

Bicycles are typically provided with a chain drive that includes a rear drive sprocket mounted to a rear hub that is mounted to a rear portion of a frame of a bicycle. Some bicycles are provided with a rear hub that includes an internal gearing mechanism for shift among a plurality of gears to change an output gear ratio from a drive sprocket. This type of rear hub is often called an internally geared hub. One example of an internally geared hub is disclosed in Japanese Registered Utility Model Publication No. 3146138. The internally geared hub disclosed in this publication has a hub axle that is mounted to a rear portion of a bicycle frame, a hub shell that is arranged to rotate freely about the hub axle, a driver, a rotation transmitting mechanism with a planetary gear mechanism and a gear changing mechanism. The driver is mounted between the hub axle and the hub shell such that it can rotate freely relative to both the hub axle and the hub shell. The planetary gear mechanism of the rotation transmitting mechanism transmits rotation of the driver to the hub shell through one of a plurality of gears (gear ratios). The gear changing mechanism shift among (i.e., select one of) the gears of the rotation transmitting mechanism.

In the conventional internally geared hub presented in the aforementioned publication, a high gear among the plurality of gears transmits rotation of the driver directly to the hub shell. As a result, particularly in assisted bicycles having a motor to assist with pedaling, the service life of the high gear (which is used frequently) is increased, and thus, the service life of the entire internally geared hub can be increased. Additionally, the conventional internally geared hub is provided with a one-way clutch serving to transmit rotation of a carrier of the planetary gear mechanism to the hub shell only in a drive direction. As a result, when a rider is coasting without pedaling (e.g., on a downhill slope), the rotation of the hub shell is not transmitted to the driver and a torque is not transmitted to the pedals.

SUMMARY OF THE INVENTION

With the conventional internally geared hub described above, rotation of the hub shell is not transmitted to the driver. Consequently, when the hub is used in an electric motor assisted bicycle provided with an electric motor to drive a crankshaft, rotation of the hub shell cannot be used to drive the electric motor as an electric generator for regenerative charging.

One object of the present invention is to provide an internally geared hub that enables an electric motor in an electric motor assisted bicycle to be used for regenerative charging.

In accordance with a first aspect, an internally geared hub is provided that mainly comprises a hub axle, a hub shell, a driver, a planetary gear mechanism and a gear changing mechanism. The hub shell is arranged to rotate freely about the hub axle. The driver is rotatably mounted between the hub axle and the hub shell such that the driver rotates freely relative to both the hub axle and the hub shell. The planetary gear mechanism is operatively connected between the hub shell and the driver. The planetary gear mechanism includes a plurality of driver rotation transmission paths that transmits rotation of the driver in a prescribed operating direction to the hub shell, and a hub shell rotation transmission path that transmits rotation of the hub shell in the prescribed operating direction to the driver. The gear changing mechanism is operatively connected to the planetary gear mechanism for selectively establishing one of the driver rotation transmission paths or the hub shell rotation transmission path.

With this internally geared hub, when a rider pedals, a rotation in the prescribed operating direction is transmitted to the driver through a chain, belt, or other drive force transmitting member. The rotation of the driver in the prescribed operating direction is transmitted to the hub shell through a driver rotation transmission path selected by the gear changing mechanism and the hub shell rotates in the prescribed operating direction. Meanwhile, when the bicycle is coasting and the hub shell is rotating in the prescribed operating direction without rotation being transmitted to the driver by the drive force transmitting member, the rotation of the hub shell is transmitted to the driver through the hub shell rotation transmission path. Since the internally geared hub is provided with a hub shell rotation transmission path that transmits rotation of the hub shell to the driver, the driver rotates when the bicycle is coasting and such rotation of the driver can be transmitted through the drive force transmitting member so as to rotate a crankshaft or a member located peripherally with respect to the crankshaft. The electric motor can then be used to conduct regenerative charging by using the transmitted rotation of the crankshaft or the member peripheral to the crankshaft to drive the electric motor.

In accordance with a second aspect, the internally geared hub of the first aspect is further configured such that the planetary gear mechanism includes an output end part that is fixedly connected to the hub shell such that the output end part rotates integrally with the hub shell. With this aspect, since an output end part of a driver rotation transmission path is connected to the hub shell such that it can rotate integrally therewith, the hub shell rotation transmission path can use the output end part of the driver rotation transmission path to transmit rotation of the hub shell to the driver.

In accordance with a third aspect, the internally geared hub of the second aspect is further configured such that the output end part of the planetary gear mechanism is a carrier of the planetary gear mechanism. With this aspect, since rotation is outputted from a carrier connected to the hub shell such that it can rotate integrally therewith, the hub shell rotation transmission path can easily transmit rotation from the carrier to the driver and the structure of the hub shell rotation transmission path can be simplified.

In accordance with a fourth aspect, the internally geared hub of the third aspect is further configured such that the planetary gear mechanism includes a ring gear arranged around an external circumference of the driver, a first sun gear rotatably mounted around the hub axle, a second sun gear rotatably mounted around the hub axle, at least one first planet gear engaged with the ring gear and the first sun gear, at least one second planet gear engaged with the ring gear and the second sun gear, and a carrier rotatably supporting the first and second planet gears. Also with this aspect, the carrier is fixedly connected to the hub shell as an output end part of the planetary gear mechanism such that the carrier rotates integrally with the hub shell about the hub axle. In addition, with this aspect, the second sun gear has a larger number of teeth than the first sun gear.

With this aspect, the hub shell can be rotated at any one of three different rotational speeds by the planetary gear mechanism, i.e., at the same rotational speed as the driver or either of two other rotational speeds that are different from the rotational speed of the driver. Also, since the driver can be driven directly by the carrier, the structure of the hub shell rotation transmission path can be simplified.

In accordance with a fifth aspect, the internally geared hub of the fourth aspect is further configured with a first one-way clutch that transmits rotation from the driver to the ring gear only in the prescribed operating direction; and a second one-way clutch that prevents rotation of the first sun gear only in a direction opposite the prescribed operating direction, with the first and second one-way clutches being operatively disposed in the driver rotation transmission paths. With this aspect, two different rotational speeds can be obtained in a driver rotation transmission path that employs the first one-way clutch to transmit rotation from the driver to the ring gear.

In accordance with a sixth aspect, the internally geared hub of the fifth aspect is further configured with a third one-way clutch that transmits rotation from the carrier to the driver in the prescribed operating direction during operation of the planetary gear mechanism along the hub shell rotation transmission path; and a first one-way clutch state changing section that puts the first one-way clutch into a disconnected state when the hub shell rotates in the prescribed operating direction. With this aspect, the driver does not lock when rotation is transmitted from the carrier to the driver through the hub shell rotation transmission path because rotation is not permitted to be transmitted from the ring gear.

In accordance with a seventh aspect, the internally geared hub of the sixth aspect is further configured such that the first one-way clutch includes a clutch pawl, a plurality of ratchet teeth and a force applying member, with the clutch pawl being pivotally attached to an external circumferential surface of the driver to move between an upright orientation and a prone orientation, the ratchet teeth being provided on an internal circumferential surface of the ring gear, and the force applying member biasing force the clutch pawl to the upright orientation such that a tip end of the clutch pawl is engaged with the ratchet teeth. In addition, with this aspect, the first one-way clutch state changing section includes a clutch pawl state changing part and a moving mechanism, with the clutch pawl state changing part being pivotally mounted on the external circumferential surface of the driver in a rotational direction between first and second positions that are separated from each other, with the moving mechanism moving the clutch pawl state changing part from the first position to the second position in response to rotation of the carrier in the prescribed operating direction such that the clutch pawl is in the upright orientation while the clutch pawl state changing part is in the first position and such that the clutch pawl is in the prone orientation when in the second position. With this aspect, the one-way clutch can be put into a disconnected state by the clutch pawl state changing part when the carrier is rotated by rotation transmitted from the hub shell.

In accordance with an eighth aspect, the internally geared hub of the fifth to seventh aspects is further configured such that the gear changing mechanism includes a movable member, a first clutch mechanism, a second clutch mechanism and an operating mechanism, with the operating mechanism operating the first clutch mechanism and the second clutch mechanism in response to a movement of the movable member, the first clutch mechanism switching the driver and the carrier between a connected state and a disconnected state in response to the movement of the movable member, and the second clutch mechanism switching the second sun gear between a first state in which it can rotate in the prescribed operating direction and a second state in which it cannot rotate in the prescribed operating direction in response to the movement of the movable member. With this aspect, when the carrier is connected to the driver by the first clutch mechanism, a rotation of the driver is transmitted directly to the carrier and from the carrier to the hub shell. When the first clutch mechanism is disconnected, a rotation of the driver is transmitted through the ring gear and if the second clutch mechanism is in the non-rotatable state, then the speed of the rotation is reduced by a reduction ratio (gear ratio) resulting from meshing of the second sun gear with the second planet gear before the rotation is transmitted to the hub shell. Meanwhile, if the second clutch mechanism is in the rotatable state, then the speed of the rotation is reduced by a reduction ratio resulting from meshing of the first sun gear with the first planet gear. Since the driver rotation transmission path configured and arranged to drive the hub shell directly is a high gear that is used frequently, the service life of the internally geared hub is improved.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
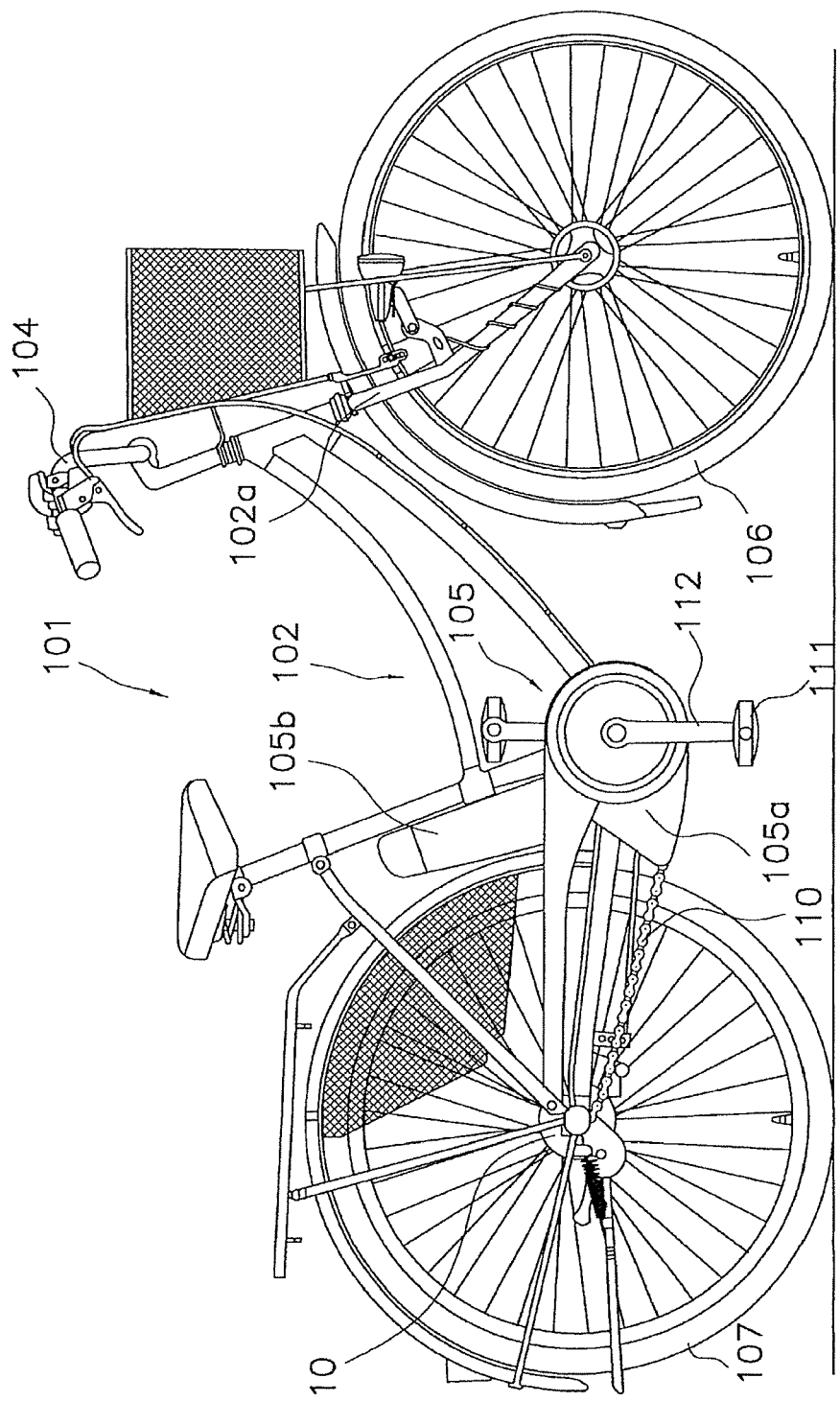
FIG. 1 is a side elevational view of a bicycle having an internally geared hub in accordance with an illustrated embodiment.

Referring initially to FIG. 1, a bicycle 101 is illustrated with an internally geared hub 10 in accordance with one illustrated embodiment. The bicycle 101 mainly includes a frame 102, a handlebar 104, a drive section 105, a front wheel 106 and a rear wheel 107. The drive section 105 includes a chain 110 and a pair of pedals 111 mounted on a pair of crank 11. The frame 102 has a front fork 102b that is mounted to a front portion of the frame for supporting the front wheel 106 such that the front fork 102b can pivot freely about a diagonal axis. The handlebar 104 is fastened to an upper end of the front fork 102a. The rear wheel 107 of the bicycle 101 is provided with the internally geared hub 10. The drive section 105 has an electric motor assist mechanism 105a that includes an electric motor (not shown) and a detachable rechargeable battery 105b serving as an electric power source for the electric motor assist mechanism 105a. The electric motor assist mechanism 105a generates a prescribed assistance torque with respect to a torque applied to the crankshaft by a rider, and exerts the assistance torque against the crankshaft. For example, the assistance torque of the electric motor assist mechanism 105a can be twice as large as a torque applied by pedaling. The drive section 105 transfers power to the internally geared hub 10 through a chain 110, or alternatively through a belt (not shown).

Figure 2:
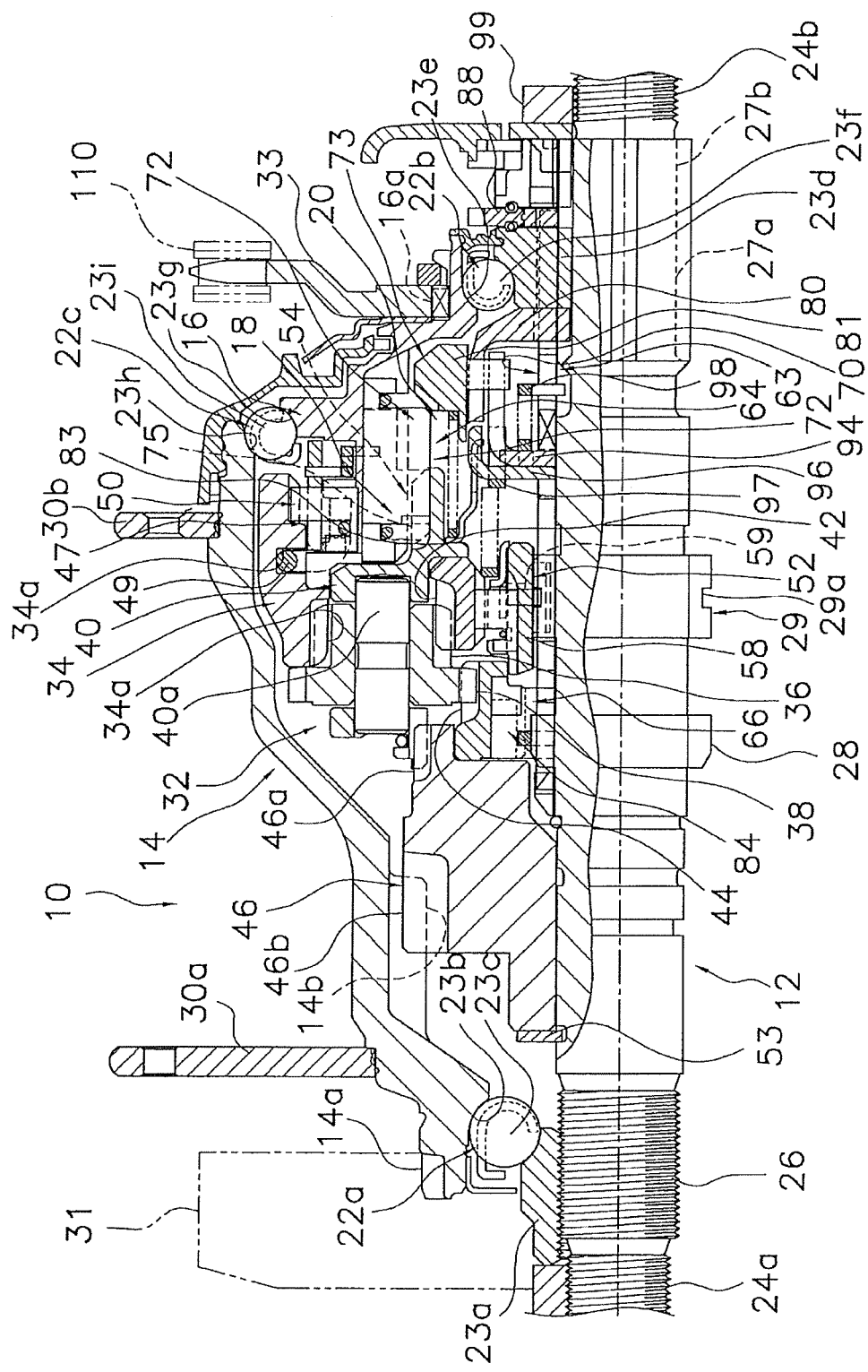
FIG. 2 is a vertical cross sectional view of the internally geared hub in accordance with illustrated embodiment.

As shown in FIG. 2, the internally geared hub 10 includes a hub axle 12, a hub shell 14, a cylindrical driver 16, a rotation transmitting mechanism 18 and a gear changing mechanism 20. The hub axle 12 is configured to be mounted non-rotatably to a rear portion of the frame 102. One end (left end in FIG. 2) of the hub shell 14 is rotatably supported at on the hub axle 12 with a bearing 22a. The cylindrical driver 16 is rotatably supported on the hub axle 12 with a bearing 22b. The other end of the hub shell 14 (right end in FIG. 2) is rotatably supported on the driver 16 with a bearing 22c. of the electric motor assist mechanism 105a With the internally geared hub 10, a hub shell rotation transmission path transmits rotation of the hub shell 14 to the driver 16, the driver 16 rotates when the bicycle 101 employing the internally geared hub 10 is coasting and the rotation of the driver 16 can be transmitted through a drive force transmitting member to rotate a crankshaft or a member located peripherally with respect to the crankshaft. The electric motor of the electric motor assist mechanism 105a can then be used to conduct regenerative charging by using the transmitted rotation of the crankshaft or the member peripheral to the crankshaft to drive the electric motor of the electric motor assist mechanism 105a.

The bearing 22a includes a pushing race or cone 23a, a receiving race or cup 23b, and a plurality of steel balls 23c. The pushing race or cone 23a is screw onto an externally threaded section 26 (explained later) of the hub axle 12. In the illustrated embodiment, the receiving race or cup 23b is integrally formed as a part of an internal circumferential surface of one end of the hub shell 14. The steel balls 23c are arranged between the pushing race 23a and the receiving race 23b. The bearing 22b includes a pushing race or cone 23d, a receiving race or cup 23e, and a plurality of steel balls 23f. The pushing race or cone 23d is arranged on the hub axle 12 and prevented from rotating by a rotation preventing groove 27b (described later) formed in the hub axle 12. In the illustrated embodiment, the receiving race or cup 23e is integrally formed as a part of an internal circumferential surface of one end of the driver 16. The steel balls 23f are arranged between the pushing race 23d and the receiving race 23e. The bearing 22c includes a pushing race or cone 23g, a receiving race or cup 23h, and a plurality of steel balls 23i. The pushing race or cone 23g is integrally formed as a part of an external circumferential surface of the driver 16. The receiving race or cup 23h is integrally formed as a part of an internal circumferential surface of the other end of the hub shell 14. The steel balls 23i are arranged between the pushing race 23g and the receiving race 23h.

Figure 3:
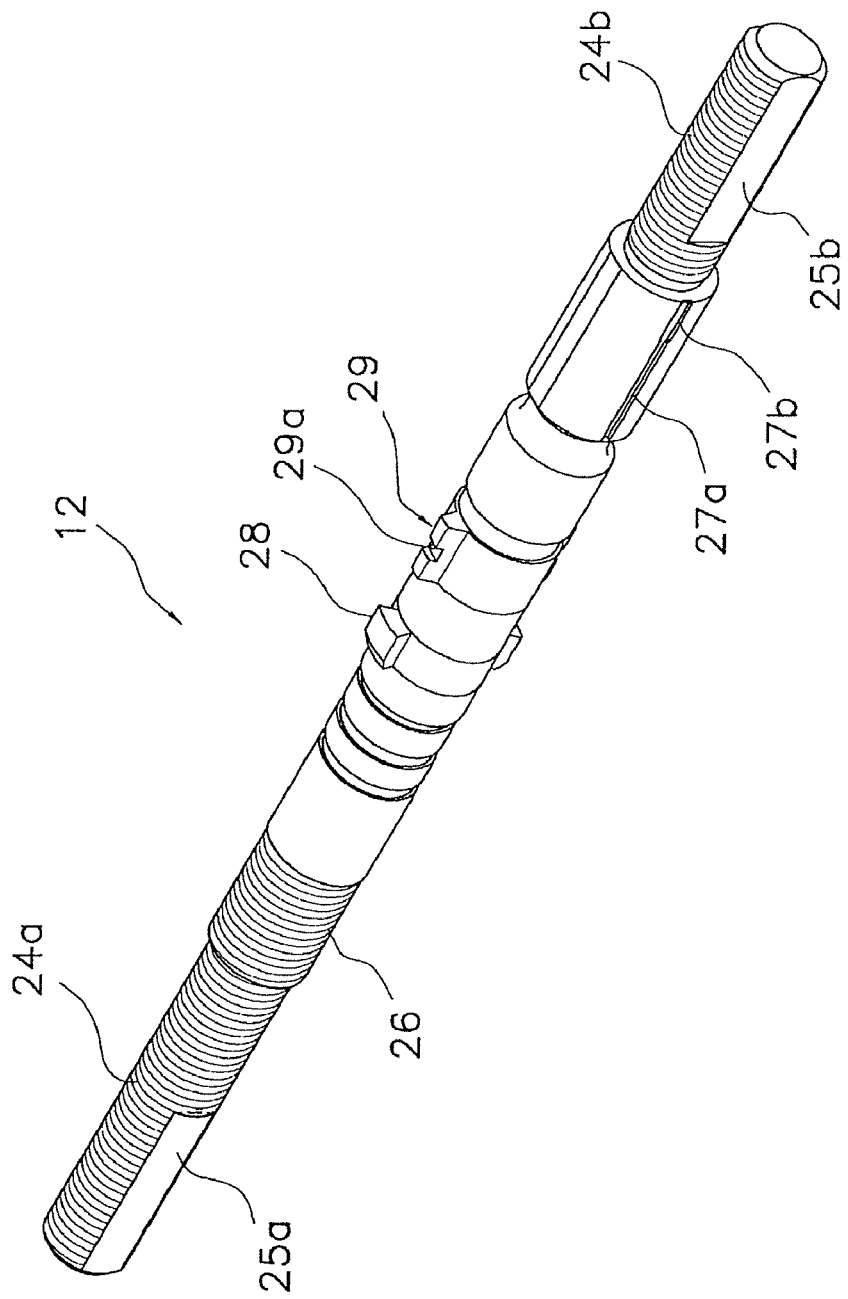
FIG. 3 is a perspective view of a hub axle of the internally geared hub in accordance with illustrated embodiment.

As shown in FIG. 3, the hub axle 12 has a first externally threaded sections 24a formed on one end and a second externally threaded section 24b formed on another end thereof for fastening the hub axle 12 to rear ends (not shown) of a rear portion of the frame 102 with nuts (not shown). The first externally threaded section 24a is provided with a pair of rotation preventing sections 25a. The second externally threaded section 24a and 24b is provided with a pair of rotation preventing sections 25b. The rotation preventing section 25a and 25b are in a parallel orientation to engage with the rear fork ends and prevent rotation of the hub axle 12. A third externally threaded section 26 is formed on the hub axle 12 in a position axially inward from the first externally threaded section 24a for mounting the bearing 22a. Two rotation preventing grooves 27a are formed at an axial position on the hub axle 12 that is axially inward of the second externally threaded section 24b for preventing rotation of the bearing 22b. The rotation preventing grooves 27a are arranged at 180-degree intervals about the hub axle 12. Two rotation preventing grooves 27b are formed at an axial position on the hub axle 12 that is axially inward of the second externally threaded section 24b for preventing rotation of the gear changing mechanism 20. The rotation preventing grooves 27b are arranged at 180° intervals about the hub axle 12. The rotation preventing grooves 27a and 27b are straight grooves that extend along an axial direction of the hub axle 12. The rotation preventing grooves 27a have different widths from the rotation preventing grooves 27b, with the rotation preventing grooves 27a having a smaller width than the rotation preventing grooves 27b. Two first protrusions 28 are formed at 180-degree intervals in an axially middle portion of the hub axle 12, with the first protrusions 28 functioning as a one-way clutch of the gear changing mechanism 20. Two second protrusions 29 are also formed at 180-degree intervals in an axially middle portion of the hub axle 12 functioning to prevent rotation are formed at 180-degree intervals in an axially middle portion of the hub axle 12. The first protrusions 28 and the second protrusions 29 protrude in a radially outward direction with respect to a center longitudinal axis of the hub axle 12. A positioning recess 29a is formed in an axially middle portion of each of the second protrusions 29.

The hub shell 14 rotates freely about the hub axle 12. As shown in FIG. 2, the hub shell 14 is a cylindrical member with a diameter that increases in a step-like manner from one end (left end in FIG. 2) to the other end (right end in FIG. 2). Two hub flanges 30a and 30b are provided on an external circumferential surface of the hub shell 14. The hub flanges 30a and 30b are spaced apart in an axial direction along the hub shell 14. The hub flanges 30a and 30b are configured for spokes of the rear wheel 107 to connect thereto and are attached such that they can rotate integrally with the hub shell 14.

One end (left end in FIG. 2) of the hub shell 14 is provided with a brake mounting part 14a for mounting a rear wheel brake device 31. For example, the brake mounting part 14a has a spline structure for mounting the rear wheel brake device 31. An internal circumferential surface of the hub shell 14 is provided with a coupling part 14b to couple with the rotation transmitting mechanism 18 such that the hub shell 14 can rotate integrally with the rotation transmitting mechanism 18. For example, the coupling part 14b has a spline structure that mates with the rotation transmitting mechanism 18.

The driver 16 is a cylindrical member mounted between the hub axle 12 and the hub shell 14 such that the driver 16 can rotate freely with respect to both the hub axle 12 and the hub shell 14. The driver 16 has an outer diameter that decreases in a step-like manner from one end (left end in FIG. 2) to the other end (right end in FIG. 2). The driver 16 has a sprocket mounting part 16a that is formed on an external circumferential surface of its axially outward positioned end (right end in FIG. 2) for mounting a sprocket 33. For example, the external circumferential surface of its axially outward positioned end (right end in FIG. 2) has a spline structure for mounting the sprocket 33. The sprocket 33 has external teeth that mesh with the chain 110.

Figure 13:
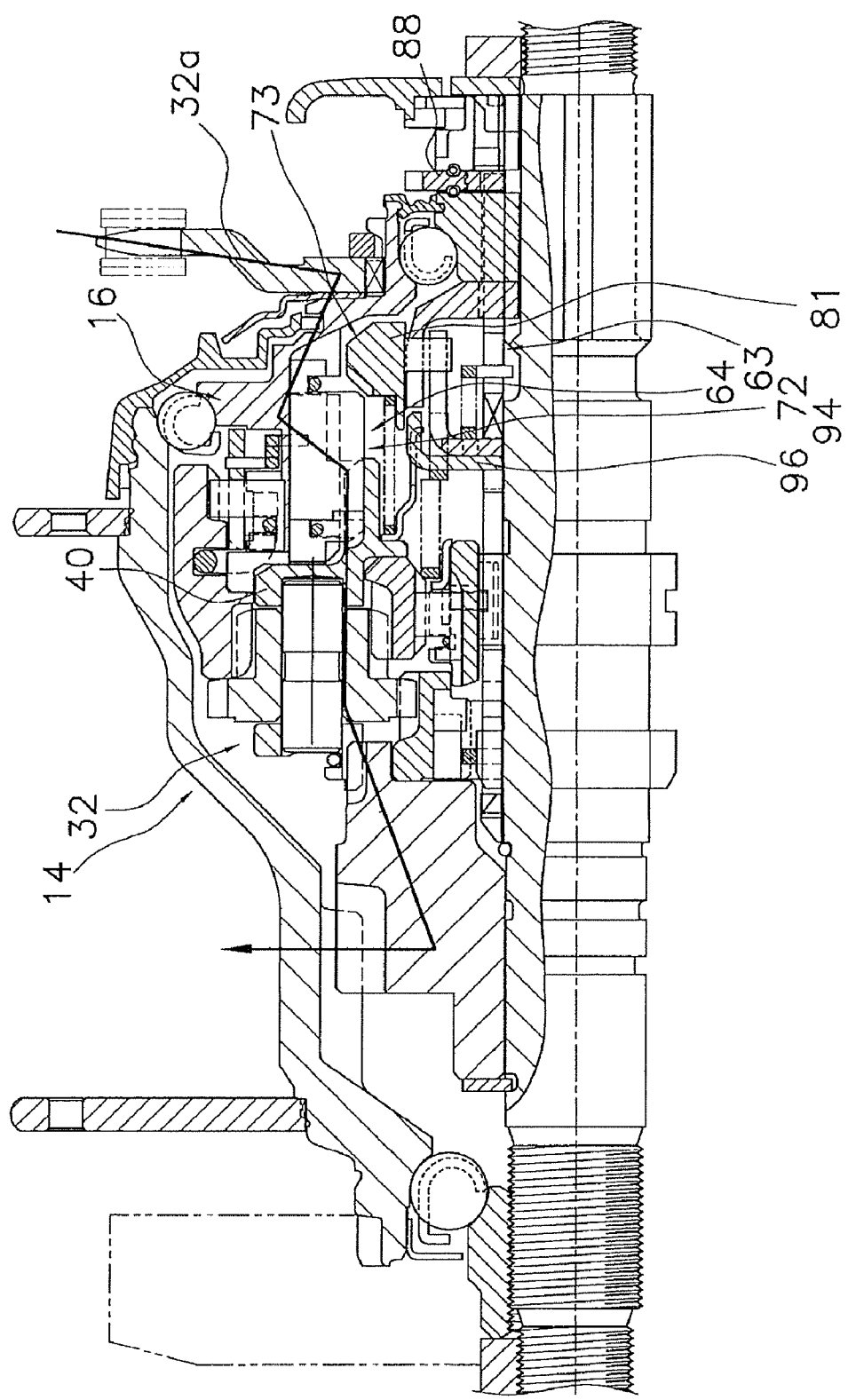
FIG. 13 is a view corresponding to FIG. 2 for explaining a first driver rotation transmission path.
Figure 14:
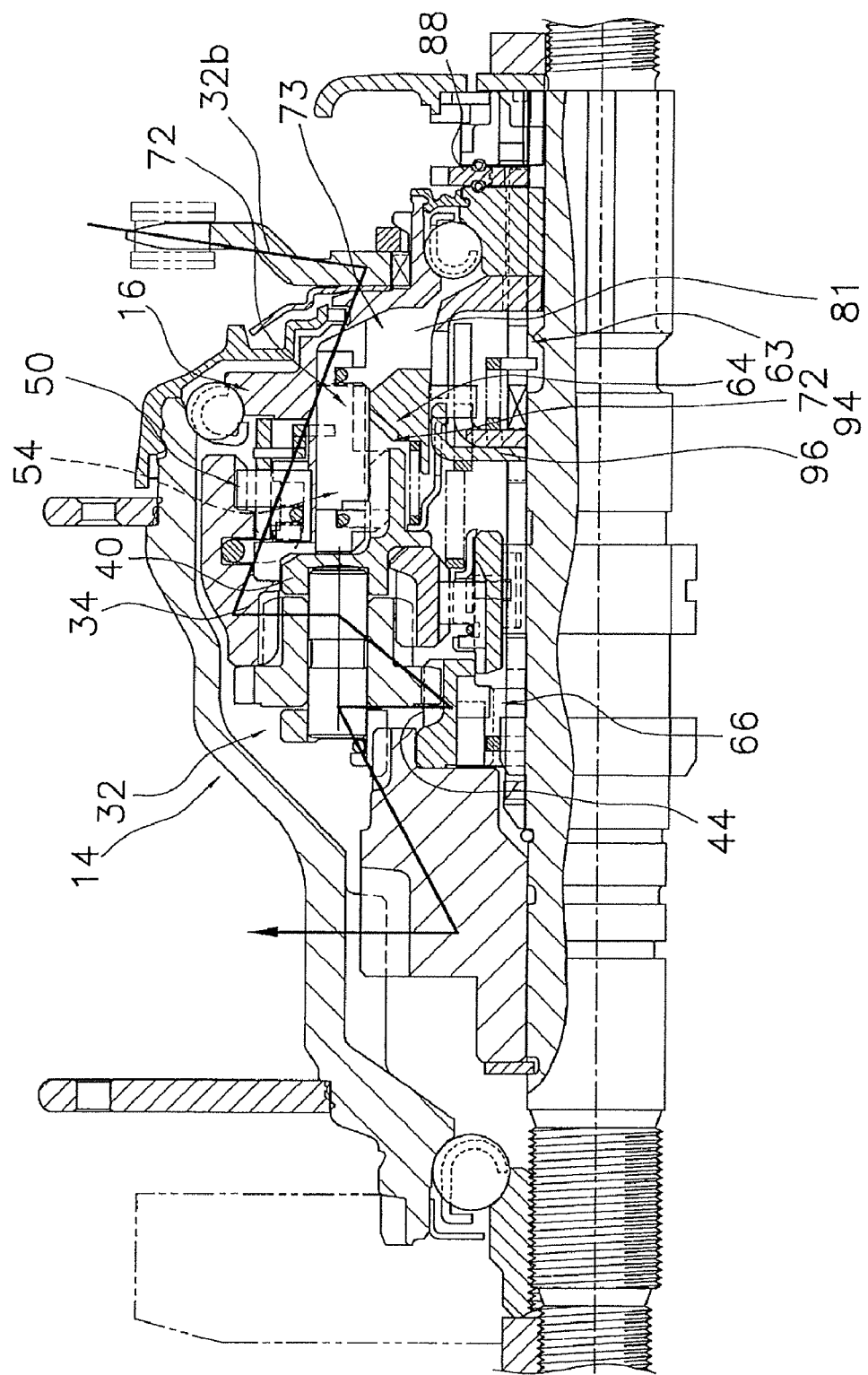
FIG. 14 is a vertical cross sectional view, corresponding to FIG. 2, of the internally geared hub for explaining a second driver rotation transmission path.
Figure 15:
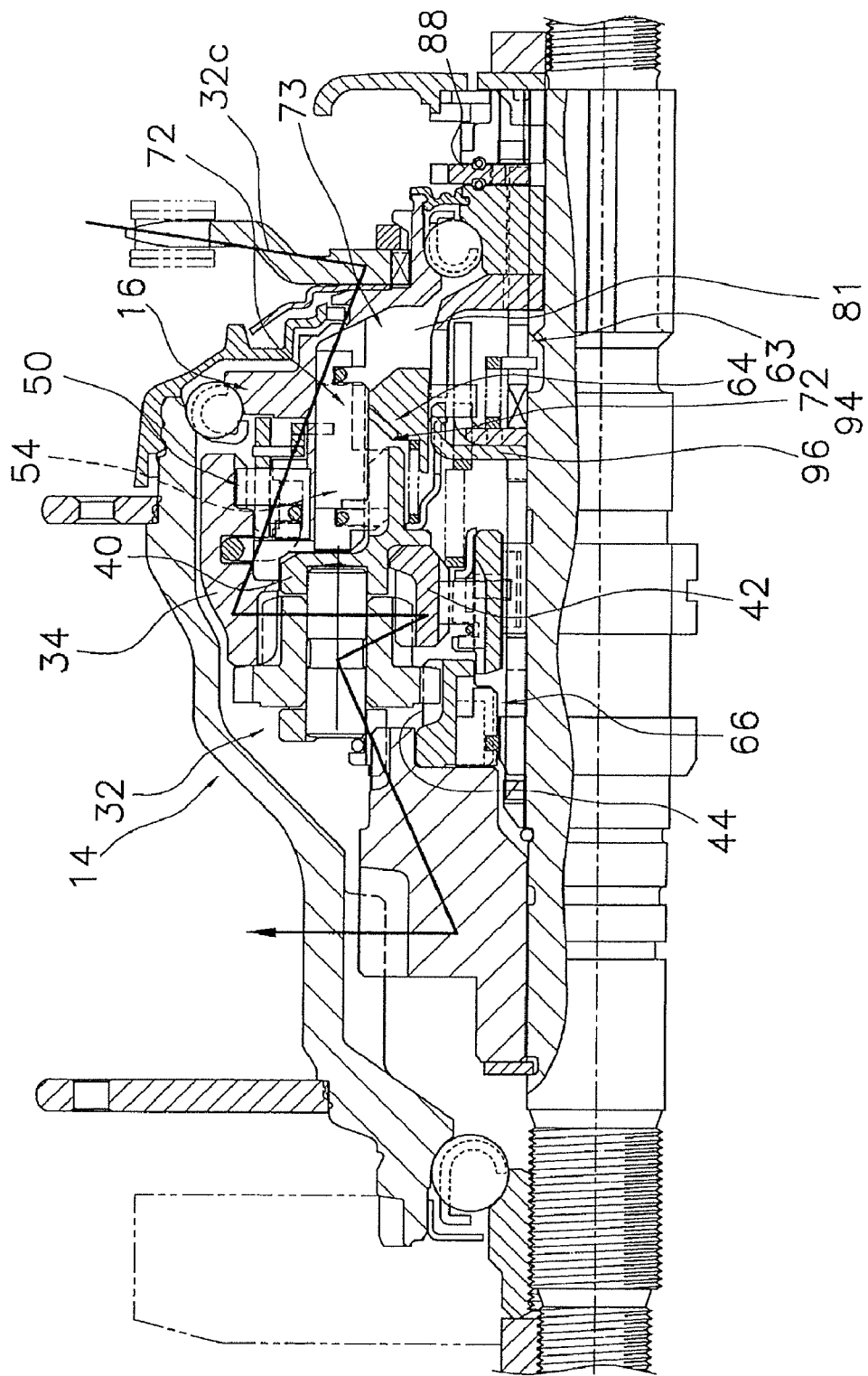
FIG. 15 is a vertical cross sectional view, corresponding to FIG. 2, of the internally geared hub for explaining a third driver rotation transmission path.
Figure 16:
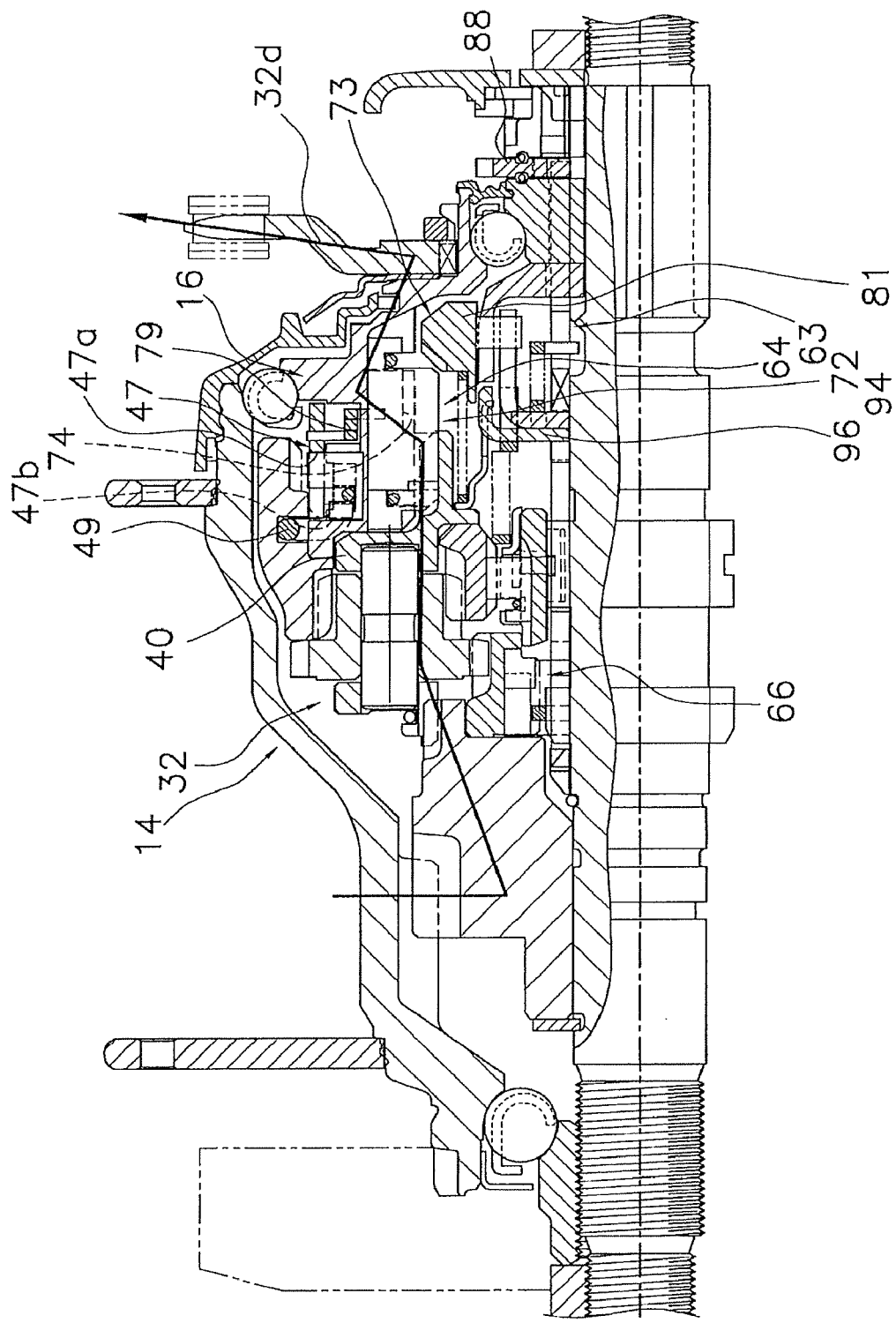
FIG. 16 is a vertical cross sectional view, corresponding to FIG. 2, of the internally geared hub for explaining a hub shell rotation transmission path.

The rotation transmitting mechanism 18 has a planetary gear mechanism 32 for transmitting rotation of the driver 16 to the hub shell 14 and for transmitting rotation of the hub shell 14 to the driver 16. The planetary gear mechanism 32 includes a ring gear 34, three first planet gear 36, three second planet gear 38, a carrier 40, a first sun gear 42 and a second sun gear 44. As seen in FIGS. 13 to 15, the planetary gear mechanism 32 can be controlled to form a first driver rotation transmission path 32a, a second driver rotation transmission path 32b and a third driver rotation transmission path 32c. The first to third driver rotation transmission paths 32a to 32c transmit rotation of the driver 16 in a forward advancement direction (indicated by the arrow A in FIG. 4) to the hub shell 14 at three different speeds (gear ratios). The forward advancement direction (indicated by the arrow A in FIG. 4) is an example of a "prescribed operating direction". As seen in FIG. 16, the planetary gear mechanism 32 can also be controlled to form a hub shell rotation transmission path 32d for transmitting rotation of the hub shell 14 in a forward advancement direction to the driver 16. The first to third driver rotation transmission paths 32a to 32c and the hub shell rotation transmission path 32d will now be explained while explaining the operation of the planetary gear mechanism 32.

The planetary gear mechanism 32 will now be explained in more detail. The ring gear 34 is arranged around an external circumference of the other end (left end in FIG. 2) of the driver 16 such that it can rotate freely about the hub axle 12. The ring gear 34 has an internally toothed gear 34a provided on an internal circumferential surface thereof. The first planet gears 36 mesh with the internally toothed gear 34a of the ring gear 34. Each of the second planet gears 38 rotates integrally with a corresponding one of the first planet gears 36. The second planet gears 38a have a larger number of teeth than the first planet gears 36. The carrier 40 rotatably supports the first and second planet gears 36 and 38 such that the first and second planet gears 36 and 38 are arranged with equal spacing in a circumferential direction. The carrier 40 can rotate freely about the hub axle 12 with the first and second planet gears 36 and 38. The first sun gear 42 rotates about the hub axle 12 and meshes with the first planet gears 36. The second sun gear 44 rotates about the hub axle 12 and meshes with the second planet gears 38.

Although in this embodiment uses three of the first and second planet gears 36 and 38, the planetary gear mechanism 32 can have fewer (at least one) or more of the first and second planet gears 36 and 38. Although in this embodiment corresponding ones of the first and second planet gears 36 and 38 are formed as a one-piece integral unit, it is also acceptable for the gears to be provided as separate entities. When the corresponding ones of the first and second planet gears 36 and 38 are formed as separate entities, it is necessary to provide a structure in which the internally toothed gear 34a meshes with the second planet gear 38 as well.

As shown in FIG. 2, the carrier 40 supports the first planet gears 36 and the second planet gears 38 with a plurality of (e.g., three) support shafts 40a arranged to be parallel to the hub axle 12. The carrier 40 is connected to the hub shell 14 such that it can rotate integrally with the hub shell 14 by a connecting member 46 that is rotatably attached to the hub axle 12. As shown in FIG. 2, the connecting member 46 is a generally cylindrical member. An external circumferential surface at one end (right end in FIG. 2) of the connecting member 46 has a first connecting part 46a that connects to an internal circumferential portion of the carrier 40 such that it can rotate integrally with the carrier 40. For example, the first connecting part 46a has a spline structure that mates with splines on the internal circumferential portion of the carrier 40. An external circumferential surface at another end (left end in FIG. 2) of the connecting member 46 has a second connecting part 46b provided on an internal circumferential surface of the hub shell 14 to connect to the connecting part 14b such that it can rotate integrally with the hub shell 14. For example, the second connecting part 46b has a spline structure that mates with splines of the connecting part 14b. Movement of the connecting member 46 in an axial direction is restricted by a retaining ring 53 that is attached to an external circumferential surface of the hub axle 12.

Figure 4:
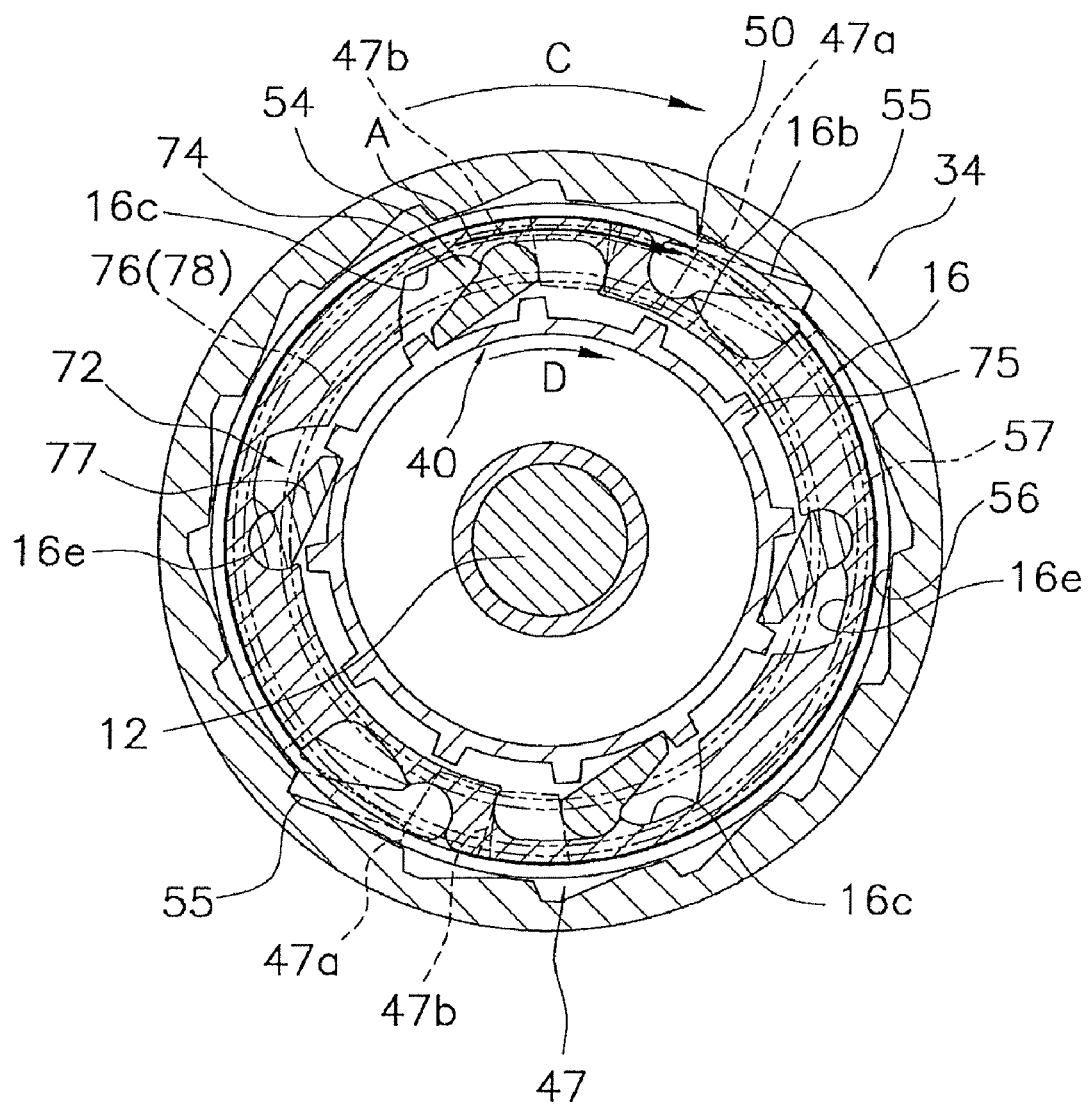
FIG. 4 is a transverse cross sectional view of a first one-way clutch of the internally geared hub in accordance with illustrated embodiment.
Figure 5:
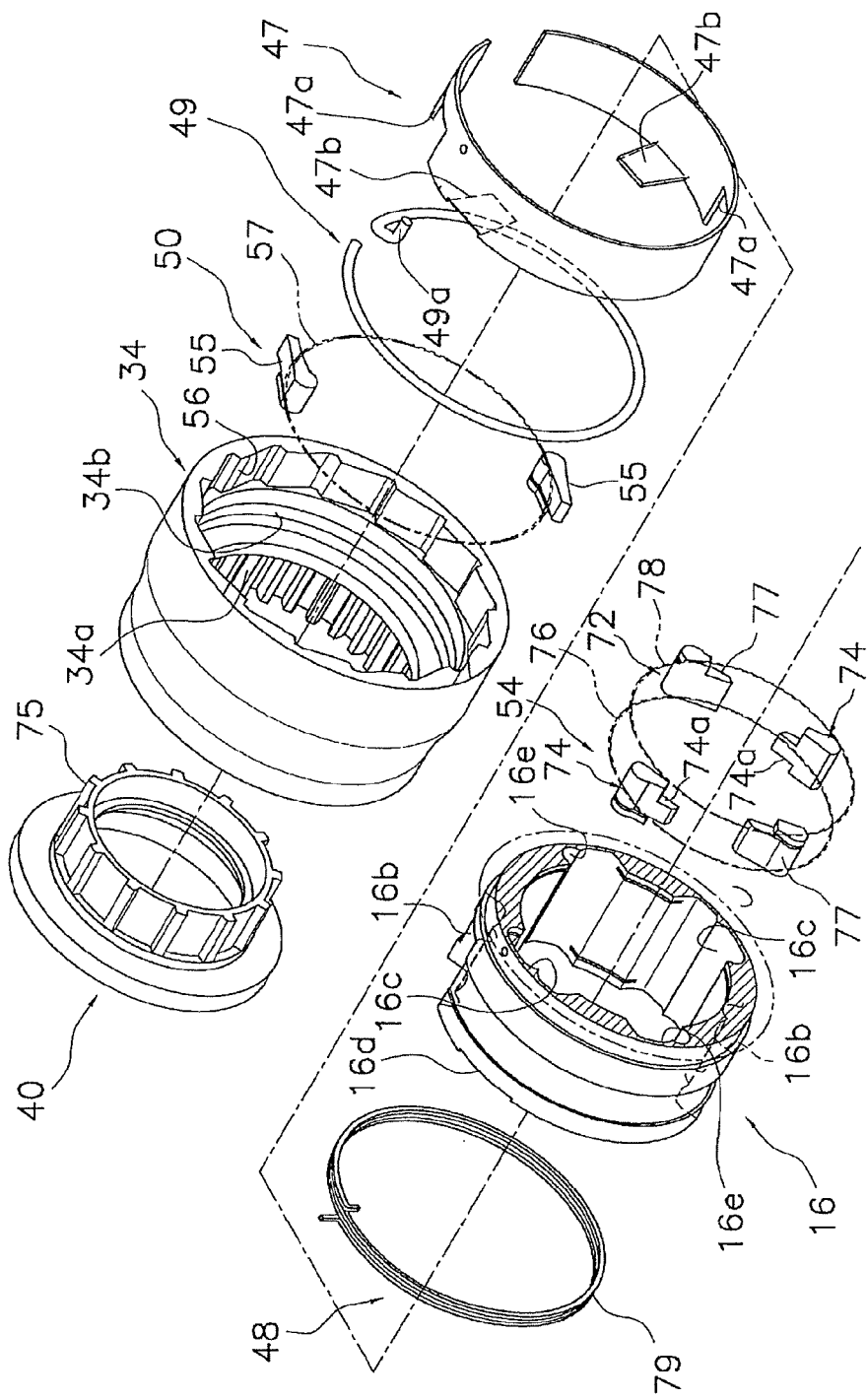
FIG. 5 is a side cross sectional view of a second one-way clutch of the internally geared hub in accordance with illustrated embodiment.

The rotation transmitting mechanism 18 includes a first one-way clutch 50, a second one-way clutch 52, a third one-way clutch 54, and a first one-way clutch state changing section 51. As shown in FIGS. 4 and 5, the first one-way clutch 50 transmits rotation of the driver 16 in a forward advancement direction (indicated with an arrow A in FIG. 4) to the ring gear 34. The first one-way clutch 50 includes a plurality of (e.g., two) first clutch pawls 55 and first ratchet teeth 56. The first clutch pawls 55 are mounted in first mounting recesses 16b formed in an external circumferential surface of the driver 16 at the other end (left end in FIG. 2) of the driver 16 such that the first clutch pawls 55 can pivot freely between an upright state and a prone state. The first ratchet teeth 56 are formed on an internal circumferential surface of the ring gear 34. The first ratchet teeth 56 mesh with the first clutch pawls 55. The first clutch pawls 55 are spring loaded toward an upright state in which they mesh with the first ratchet teeth 56 by a first spring member 57. The first spring member 57 is made of an elastic wire-like material that is bent into a C-shape. The first spring member 57 is mounted onto an external circumferential surface of the driver 16.

Figure 6:
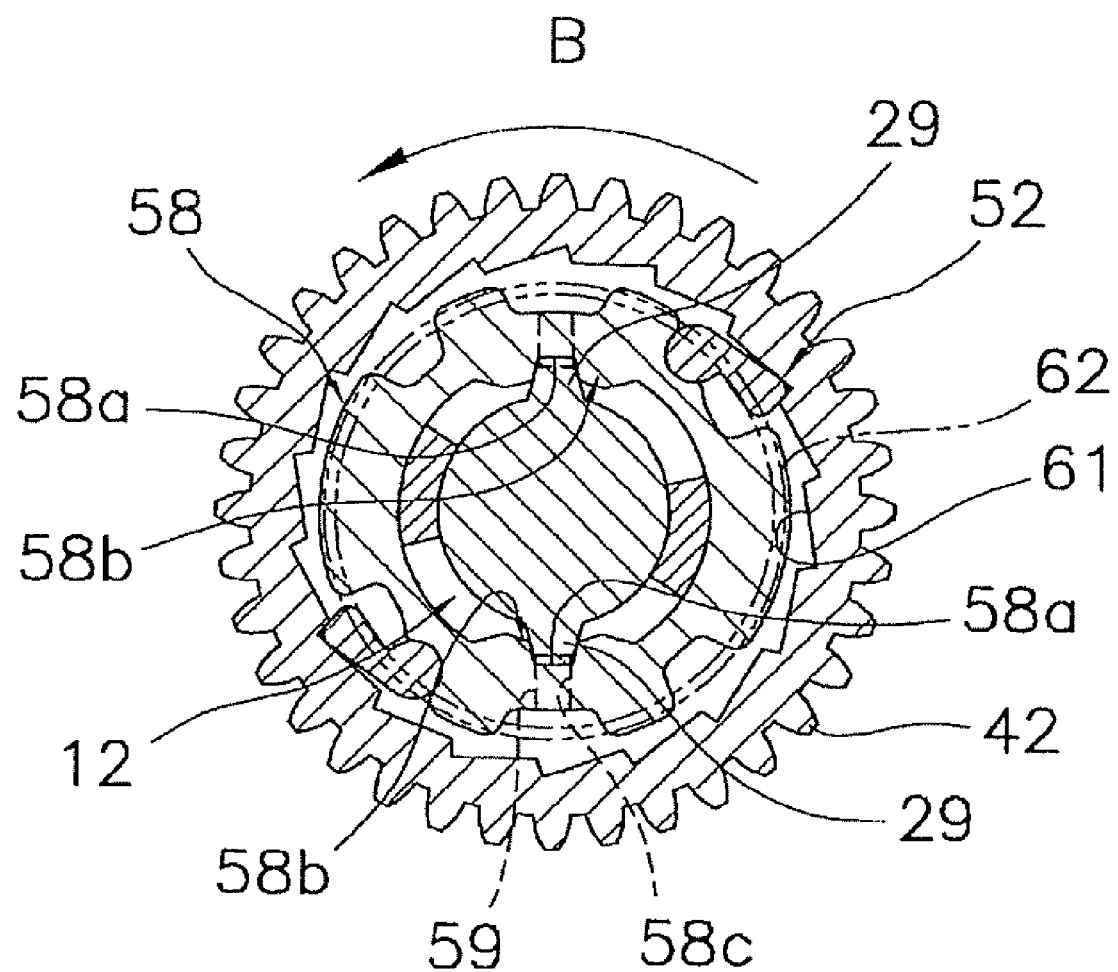
FIG. 6 is a transverse cross sectional view of a third one-way clutch of the internally geared hub in accordance with illustrated embodiment.
Figure 7:
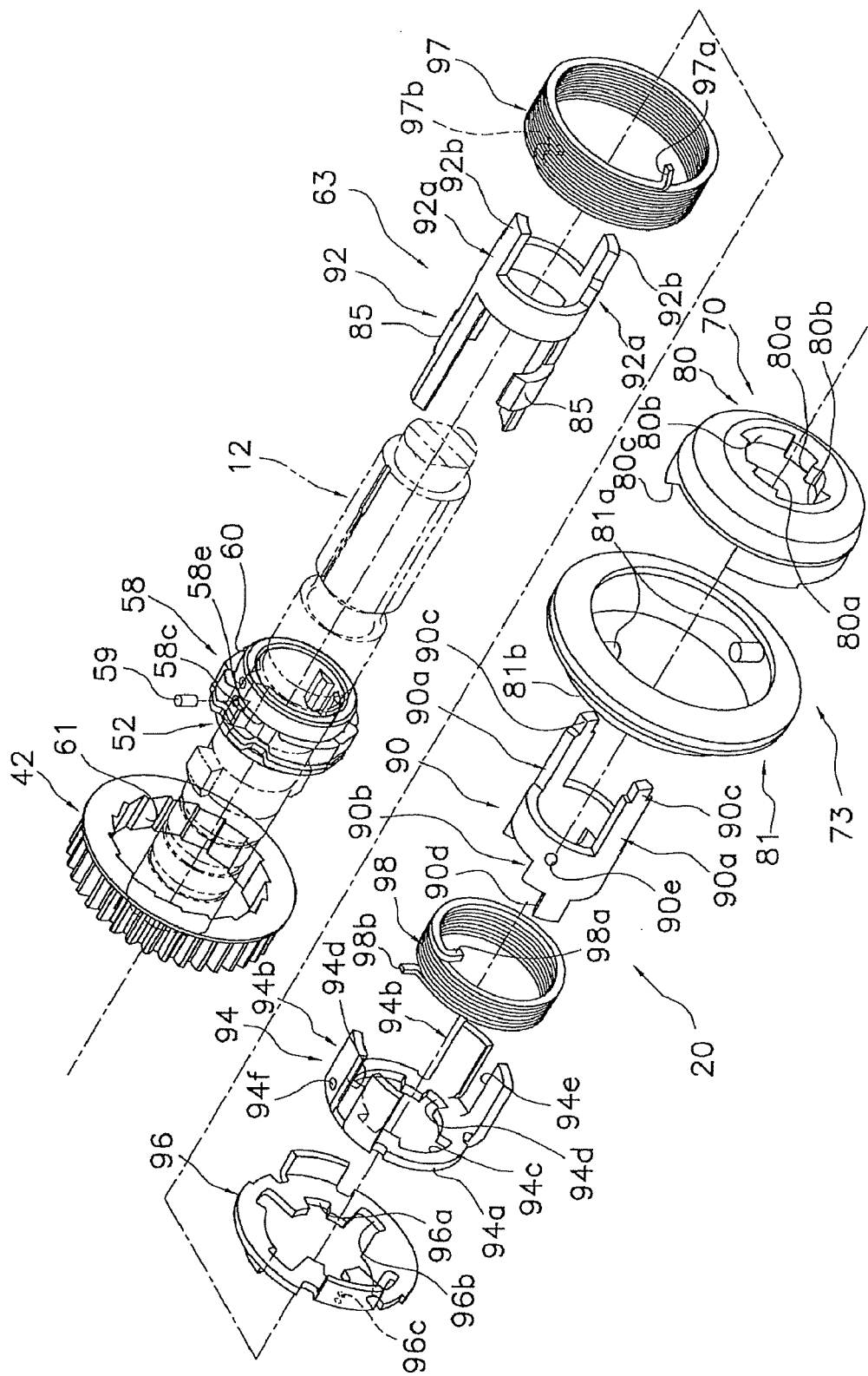
FIG. 7 is an exploded perspective view of a gear changing mechanism of the internally geared hub in accordance with illustrated embodiment.

As shown in FIGS. 6 and 7, the second one-way clutch 52 serves to prevent rotation of the first sun gear 42 in a reverse direction, i.e., the indicated with an arrow B in FIG. 6, which is opposite to the forward advancement direction. As shown in FIG. 2, the second one-way clutch 52 has a cylindrical second pawl support part 58 that is connected non-rotatably to the hub axle 12. As shown in FIGS. 6 and 7, an internal circumferential surface of the second pawl support part 58 has two engaging recesses 58a and four rotation preventing parts 58b. The engaging recesses 58a selectively engage the second protrusions 29 of the hub axle 12. The rotation preventing parts 58b protrude in a radially inward direction. Movement of the second pawl support part 58 in an axial direction of the hub axle 12 is restricted by a pair of positioning pins 59 (only one shown in FIG. 7) engaging a pair of positioning recesses 29a in the second protrusions 29 of the hub axle 12. The positioning pins 59 are each arranged in a securing hole 58c that extends along a radial direction of the second pawl support part 58. The second pawl support part 58 is thus connected to the hub axle 12 such that the second pawl support part 58 cannot rotate or move in an axial direction with respect to the hub axle 12.

The second pawl support part 58 has a plurality of (e.g., two) second mounting recesses 58d. The second mounting recesses 58d are arranged on an external circumferential surface of the second pawl support part 58 so as to be spaced apart along a circumferential direction. Each of the second mounting recesses 58d supports a second clutch pawl 60 (explained later) such that the second clutch pawl 60 can pivot freely between an upright state and a prone state. The second pawl support part 58 also has a spring engaging hole 58e (FIG. 7) formed in an external circumferential surface thereof for holding an other end 97b of a first return spring 97 (described later) of the gear changing mechanism 20.

The second one-way clutch 52 further includes a plurality of (e.g., two) second clutch pawls 60 and second ratchet teeth. The second clutch pawls 60 are mounted in the second mounting recesses 58d such that they can pivot freely between an upright state and a prone state. The second ratchet teeth 61 are formed on an internal circumferential surface of the first sun gear 42. The second ratchet teeth 61 mesh with the second clutch pawl 60. The second clutch pawls 60 are spring loaded toward an upright state in which they mesh with the second ratchet teeth 61 by a second spring member 62. The second spring member 62 is made of an elastic wire-like material that is formed into a C-shape. The second spring member 62 is mounted onto an external circumferential surface of the second pawl support part 58.

As shown in FIG. 4, the third one-way clutch 54 transmits rotation from the carrier 40 to the driver 16 when rotation in the forward advancement direction (indicated by an arrow D in FIG. 4) is transmitted to the carrier 40 from the hub shell 14 during coasting. The third one-way clutch 54 has a plurality of (e.g., two) third clutch pawls 74 and third ratchet teeth 75. The internal circumferential surface of the driver 16 has a plurality of (e.g., two) third mounting recesses 16c. The third mounting recesses 16c are spaced apart in a circumferential direction. The third clutch pawls 74 are mounted in the third mounting recesses 16c. The third ratchet teeth 75 are formed on an external circumferential surface of one end of the carrier 40. The third clutch pawls 74 are mounted in the third mounting recesses 16c such that they can pivot freely between an upright state and a prone state. The third clutch pawls 74 are spring loaded toward an upright state in which they mesh with the third ratchet teeth 75 by a third spring member 76. The third spring member 76 is made of an elastic wire-like material that is bent into a C-shape. The third ratchet teeth 75 have a trapezoidal shape. The third ratchet teeth 75 are formed the external circumferential surface of the end portion of the carrier 40. This external circumferential surface of the end portion of the carrier 40 faces an internal circumferential surface of the driver 16 having the third mounting recesses 16c. A gap is formed between these two circumferential surfaces.

Each of the third mounting recesses 16c has a circumferential length such that the third clutch pawl 74 can move a prescribed distance in a circumferential direction. The circumferential length is such that the first one-way clutch state changing section 51 can move from a first position to a second position. In addition to supporting the third clutch pawls 74, the third mounting recesses 16c enable the first one-way clutch state changing section 51 to put the first one-way clutch 50 into a disconnected state when the carrier 40 rotates in a reverse direction (the opposite direction of the arrow D in FIG. 4, i.e., counterclockwise in FIG. 4).

When the carrier 40 rotates in the reverse direction and rotation is transferred from the hub shell 14 to the driver 16, the first one-way clutch state changing section 51 causes the first clutch pawls 55 to assume the prone orientation. When the first clutch pawls 55 assume the prone orientation, the first one-way clutch 50 is put into a disconnected state. The reason for disconnecting the first one-way clutch 50 is that when rotation is transmitted from the hub shell 14 to the carrier 40 in the reverse direction, the ring gear 34 rotates at a high speed in same reverse direction with respect to the carrier 40. Consequently, if the first one-way clutch 50 remained connected, then the internally geared hub 10 would lock up. Thus, the first one-way clutch 50 is put into a disconnected state when the carrier 40 rotates in the reverse direction in order to prevent the internally geared hub 10 from locking up.

The first one-way clutch state changing section 51 includes a clutch pawl state changing part 47, a moving mechanism 48 and a ring gear slide spring 49. The clutch pawl state changing part 47 is mounted to an external circumferential surface of the other end of the driver 16 such that it can turn between a first position and a second position. The moving mechanism 48 moves the clutch pawl state changing part 47 between the first position and the second position. The ring gear slide spring 49 is an example of a frictional engaging member. The clutch pawl state changing part 47 is a plate-like member curved in a circular C-shape. The clutch pawl state changing part 47 has generally rectangular notched portions 47a and a plurality of (e.g., two) engaging pieces 47b. The notched portions 47a are configured and arranged such that the first clutch pawls 55 can move between an upright state and a prone state. The engaging pieces 47b are configured and arranged such that the clutch pawl state changing part 47 moves between the first position and the second position in response to movement of the third clutch pawls 74 in a circumferential direction.

The notched portions 47a are configured such that the first clutch pawls 55 can assume an upright state when the clutch pawl state changing part 47 is in the first position. The first clutch pawls 55 are forced into a prone state against the spring force of the first spring member 57 when the clutch pawl state changing part 47 is in the second position. As a result, when the clutch pawl state changing part 47 is arranged in the second position, the first one-way clutch 51 is in a disconnected state.

The engaging pieces 47b are portions that are bent over from a side edge of the clutch pawl state changing part 47 so as to protrude in a radially inward direction. The engaging pieces 47b are arranged to contact a base end portion of the third clutch pawls 74. A turning range of the clutch pawl state changing part 47 is restricted by movement restricting sections 16d formed in an end face of the other end of the driver 16. The turning range resulting from the restriction imposed by the movement restricting sections 16d is slightly larger than the turning range between the first position and the second position.

The moving mechanism 48 includes the third clutch pawls 74 and a return spring 79. The third clutch pawls 74 serve to move the clutch pawl state changing part 47 from the first position to the second position. The return spring 79 serves to return the clutch pawl state changing part 47 from the second position to the first position. The return spring 79 is a coil spring having a first end engaged with the clutch pawl state changing part 47 and a second end engaged with an external circumferential surface of the driver 16. The return spring 79 functions to spring load the clutch pawl state changing part 47 toward the first position. When the carrier 40 rotates in the reverse direction (counterclockwise from the perspective of FIG. 4), the third clutch pawls 74 are depressed by the third ratchet teeth 75 and move clockwise (from the perspective of FIG. 4) within the third mounting recesses 16c. When the base end portions of the third clutch pawls 74 contact a wall surface of the third mounting recesses 16c, the third clutch pawls 74 stop moving within the third mounting recesses 16c and the clutch pawl state changing part 47 is arranged in the second position. Thus, only the carrier 40 rotates while the carrier 40 is moving in the reverse direction from the first position to the second position. Then, after the second position is reached, the third clutch pawls 74 contact the wall surfaces of the third mounting recesses 16c and the carrier 40 rotates integrally with the driver 16. At the same time, the first clutch pawls 55 are depressed into a prone orientation by the notched portions 47a and the first one-way clutch 50 is put into a disconnected state.

The ring gear slide spring 49 is a C-shaped member that is made of an elastic wire-like material. The ring gear slide spring 49 is mounted in an annular spring mounting groove 34b formed in an internal circumferential surface of the ring gear 34 such that it can engage in a frictional fashion. The ring gear slide spring 49 functions to hold the clutch pawl state changing part 47 in the second position. When the carrier 40 rotates in the reverse direction, the ring gear slide spring 49 functions to maintain a disconnected state between the driver 16 and the ring gear 34.

As shown in FIG. 2, the gear changing mechanism 20 has a movable member 63 contrived such that it can be moved by a shift cable (not shown) connected to, for example, a gear shifter (not shown) mounted to the handlebar 104. The gear changing mechanism 20 further includes a first clutch mechanism 64, a second clutch mechanism 66 and an operating mechanism 70. The first clutch mechanism 64 switches the driver 16 and the carrier 40 between a connected state and a disconnected state in response to a movement of the movable member 63. The second clutch mechanism 66 switches the second sun gear 44 between a state in which it can rotate and a state in which it cannot rotate in response to a movement of the movable member 63. The operating mechanism 70 operates the first clutch mechanism 64 and the second clutch mechanism 66 in response to a movement of the movable member 63.

As shown in FIGS. 2 to 7, the movable member 63 has a cable holding member 88 (FIG. 2), a first cylindrical operating part 90, and a second cylindrical operating part 92. The cable holding member 88 (FIG. 2) is configured and arranged to be connected to the shift cable. The first cylindrical operating part 90 moves in coordination with the cable holding member 88. The second cylindrical operating part 92 moves in coordination with the first cylindrical operating part 90.

The cable holding member 88 is turns on an external circumferential surface of the hub axle 12 such that it is pressed against the pushing race 23d of the bearing 22b by a nut 99 that is screwed onto the first externally threaded section 24b. The cable holding member 88 holds on to the shift cable such that it turns when the shift cable is moved in response to operation of the gear shifter. The cable holding member 88 is positioned to one of three positions, i.e., a high gear position, an intermediate gear position, and a low gear position, by the gear shifter. The cable holding member 88 turns toward the low gear position when it is pulled by the shift cable and turns toward the high gear position due to the action of the first return spring 97 (described later) when the tension of the shift cable is released.

The first cylindrical operating part 90 is turnably mounted on an external circumferential surface of the hub axle 12. As shown in FIG. 7, the first cylindrical operating part 90 has a pair of circular arc-shaped engaging protrusions 90a. The engaging protrusions 90a extend in an axial direction from one end (right end in FIG. 7) and engage with the cable holding member 88. An engaging portion 90c is formed on a tip end of each of the engaging protrusions 90a. The engaging portion 90c has a slightly narrower dimension in a circumferential direction. The engaging portion 90c engages the cable holding member 88. The engaging portions 90c engage an internal circumferential surface of the cable holding member 88 such that the first cylindrical operating part 90 is positioned to one of the three aforementioned positions when the cable holding member 88 is turned. The engaging protrusions 90a are engage the cable holding member 88 after passing through a passage recess 80b of a cam member 80.

The other end (left end in FIG. 7) of the first cylindrical operating part 90 is provided with a pair of first connecting pieces 90b. The first connecting pieces 90b are connected to the second cylindrical operating part 92. A tip end portion 90d of each of the first connecting pieces 90b has a narrower dimension in a circumferential direction than a base end portion of the same. A spring engaging hole 90e is formed in an external circumferential surface of the first cylindrical operating part 90. An end 98a (right end in FIG. 7) of a second return spring 98 (described later) is engaged with the spring engaging hole 90e.

Figure 12:
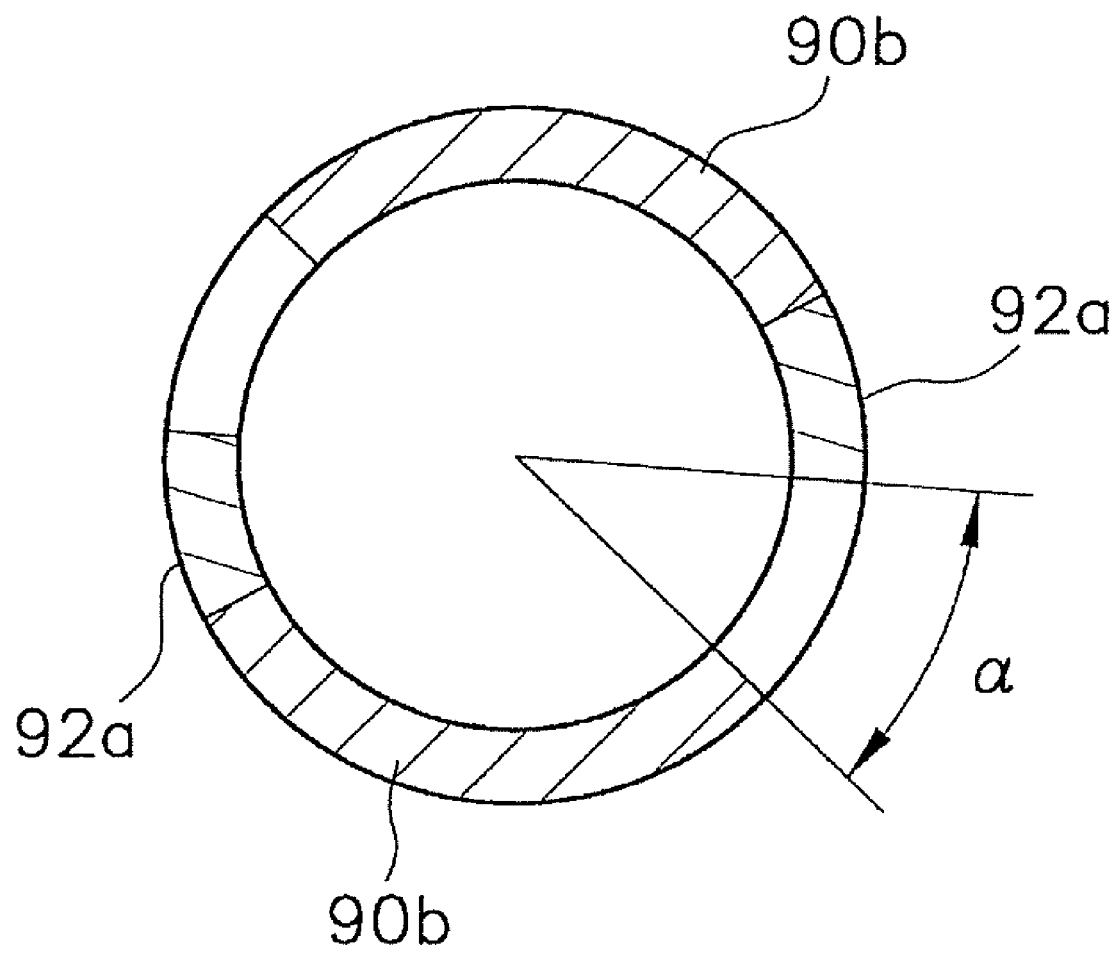
FIG. 12 is a transverse cross sectional view showing a range of relative movement that can occur between the first operating cylinder and the second operating cylinder.

One end (right end in FIG. 7) of the second cylindrical operating part 92 is provided with a pair of circular arc-shaped second connecting pieces 92a. The second connecting pieces 92a are configured to engage with the first connecting pieces 90b of the first cylindrical operating part 90. A tip end portion 92b of each of the second connecting pieces 92a has a narrower dimension in a circumferential direction than a base end portion of the same. As shown in FIG. 12, the first connecting pieces 90b and the second connecting pieces 92a can turn relative to each other up to a prescribed angle α (e.g., 40°). The other end (left end in FIG. 7) of the second cylindrical operating part 92 has a pair of second control parts 85 for controlling the second clutch mechanism 66. Preferably, the second control parts 85 are formed integrally with the second cylindrical operating part 92.

As shown in FIGS. 2, 4, 5, and 7 the first clutch mechanism 64 has a fourth one-way clutch 72 and a first control part 73. The fourth one-way clutch 72 is arranged between the driver 16 and the carrier 40. The first control part 73 is configured to control the fourth one-way clutch 72 to a connected state or a disconnected state.

The fourth one-way clutch 72 transmits rotation from the driver 16 to the carrier 40 only in the forward advancement direction as indicated by the arrow A in FIG. 4. As shown in FIG. 4, the fourth one-way clutch 72 includes the third ratchet teeth 75 (mentioned above) and a plurality of (e.g., two) fourth clutch pawls 77 and the third ratchet teeth 75. The fourth clutch pawls 77 are mounted in corresponding fourth mounting recesses 16e that are formed in an internal circumferential surface of the driver 16. The third ratchet teeth 75 are arranged to mesh with the fourth clutch pawls 77. The fourth clutch pawls 77 are mounted in the fourth mounting recesses 16e such that they can pivot freely between an upright state and a prone state. Thus, the fourth one-way clutch 72 uses the same third ratchet teeth 75 as the third one-way clutch 54. As shown in FIG. 6, the third ratchet teeth 75 are trapezoidal as mentioned previously and the fourth clutch pawls 77 engage with the opposite side thereof as the third clutch pawls 74. Thus, the third clutch pawls 74 and the fourth clutch pawls 77 are arranged with opposite orientations. The third and fourth mounting recesses 16c and 16e are arranged alternately in the internal circumferential surface of the driver 16. The fourth clutch pawls 77 are spring loaded toward an upright state in which they mesh with the third ratchet teeth 75 by a fourth spring member 78. The fourth spring member 78 is made of an elastic wire-like material that is bent into a C-shape and mounted onto an internal circumferential surface of the driver 16.

As shown in FIG. 7, the first control part 73 has a cam member 80 and a cam bearing member 81. The cam member 80 is connected non-rotatably to the hub axle 12. The cam bearing member 81 is rotatably arranged on the hub axle 12.

The cam member 80 has generally the shape of a bottomed cylinder. An internal circumferential surface of the cam member 80 has a pair of engaging protrusions for engaging with the rotation preventing groove 27a of the hub axle 12. The cam member 80 also has two circular arc-shaped passage recesses 80b formed in the internal circumferential surface of the cam member 80 for allowing the engaging protrusions 90a of the first cylindrical operating part 90 to pass through. The passage recesses 80b are configured to have a longer dimension in a circumferential direction than the engaging protrusions 90a such that the first cylindrical operating part 90 is allowed to turn within a prescribed range (e.g., approximately 40°). An end face of a cylindrical portion of the cam member 80 has a pair of inclined cams 80c for engaging the cam bearing member 81. Each of the inclined cams 80c has an inclined surface that slopes in a circumferential direction of the cam member 80.

Figure 8:
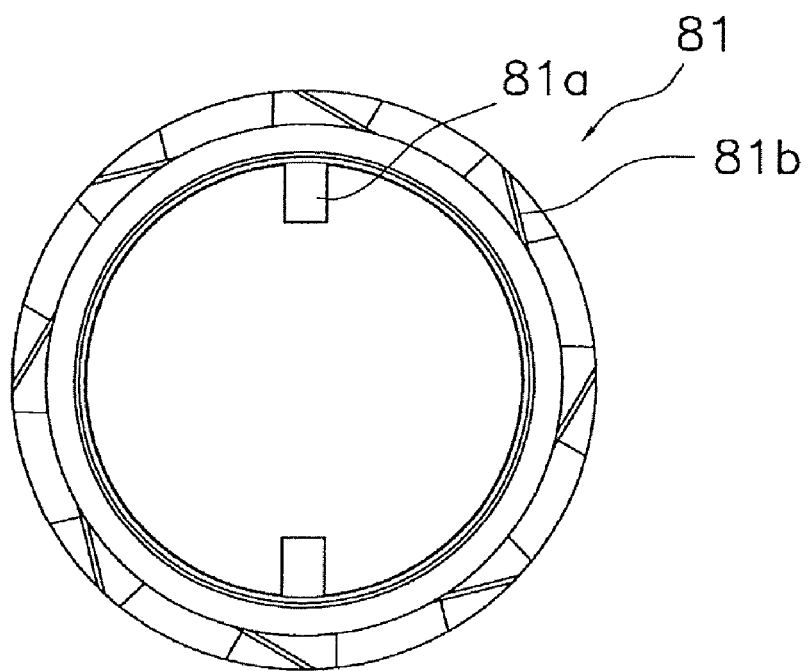
FIG. 8 is an axial elevational view of a cam bearing member of the internally geared hub in accordance with illustrated embodiment.
Figure 9:
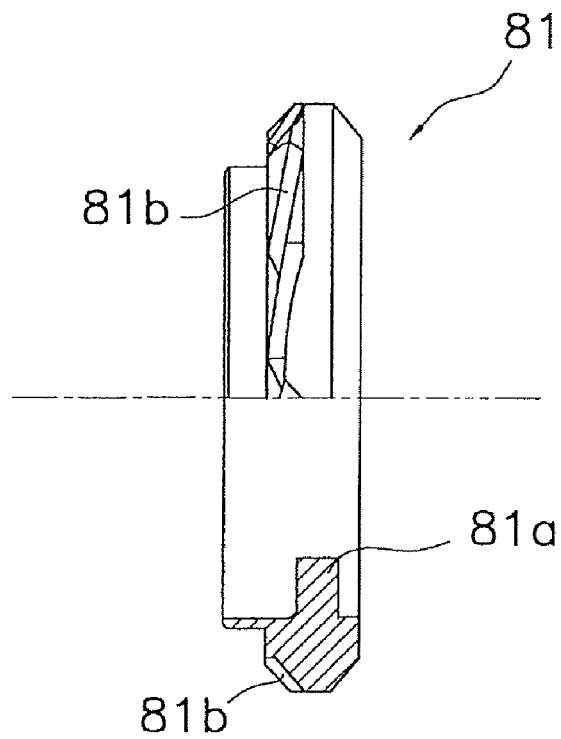
FIG. 9 is a half cross sectional view of a cam bearing member of the internally geared hub in accordance with illustrated embodiment.

As shown in FIGS. 8 and 9, the cam bearing member 81 is a ring-shaped member having a pair of cam bearing pins 81a for engaging the inclined cams 80c. The cam bearing pins 81a are formed on an internal circumferential surface of the cam bearing member 81 and protrude in a radially inward direction. One end face (end face facing away in FIG. 7) of the cam bearing member 81 has a plurality of (e.g., eight) control surfaces 81b are formed thereon. The control surfaces 81 are configured and arranged to switch the fourth claw pawls 77 between an upright state in which they engage with the third ratchet teeth 75 and a prone state in which they separate from the third ratchet teeth 75. The control surfaces 81b are spaced apart from one another along a circumferential direction and each has a cam surface that is sloped along a radial direction. The third clutch pawls 74 are arranged along the same circumference as the fourth clutch pawls 77. The third clutch pawls 74 have cut-away portions 74a as shown in FIG. 5 so that the third clutch pawls 74 do not contact the control surfaces 81b.

As shown in FIG. 2, the cam bearing member 81 is spring loaded in an axially outward direction of the hub (rightward in FIG. 2) by a coil spring 83 that is arranged between the cam bearing member 81 and the carrier 40. When a turning member 94 (described later) of the operating mechanism 70 turns in a direction that is clockwise from the perspective of FIG. 7, the cam bearing pins 81a of the cam bearing member 81 engage the inclined cams 80c of the cam member 80 and the cam bearing member 81 moves in an axially inward direction (leftward in FIG. 2) against the spring force of the coil spring 83. The axially inward movement of the bearing member 81 causes the control surfaces 81 to push the fourth clutch pawls 77 from an upright orientation to a prone orientation. As a result, the fourth one-way clutch 72 is put into a disconnected state. The fourth one-way clutch 72 turns to a connected state when the turning member 94 turns counterclockwise from the perspective of FIG. 7.

Figure 10:
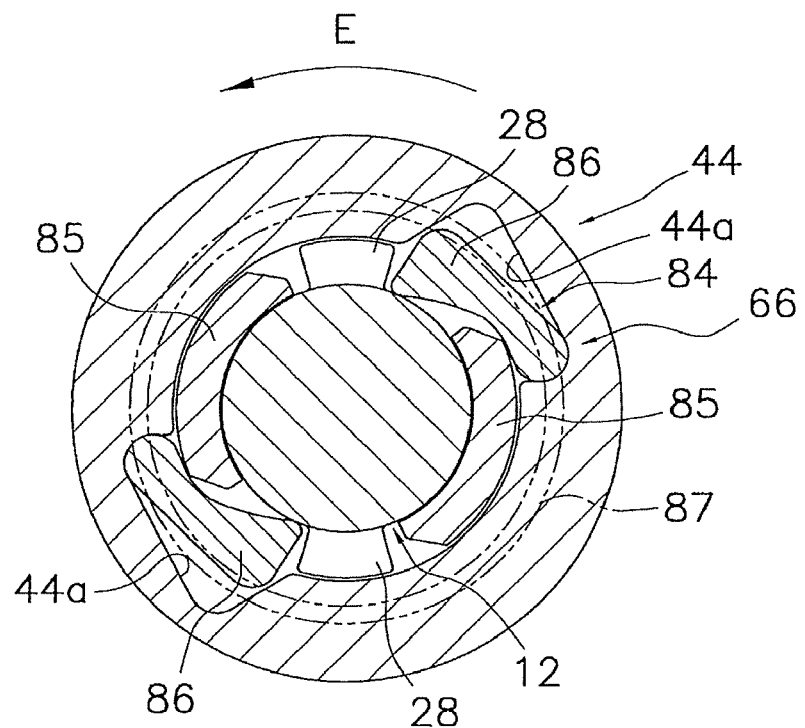
FIG. 10 is a transverse cross sectional view of a second clutch mechanism in a connected state.
Figure 11:
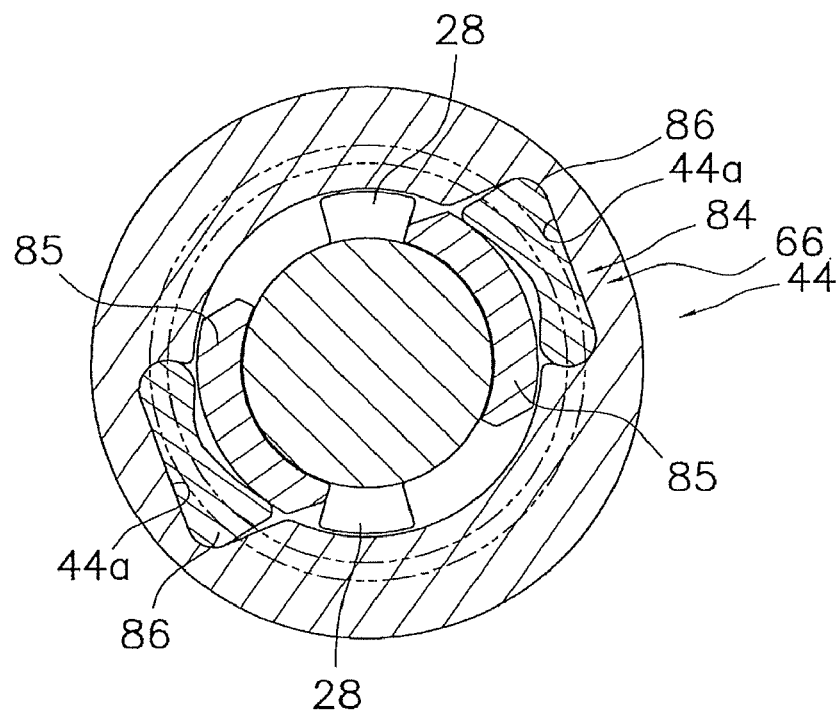
FIG. 11 is a transverse cross sectional view of the second clutch mechanism in a disconnected state.

As shown in FIGS. 10 and 11, the second clutch mechanism 66 has a fifth one-way clutch 84 and a second control part 85. The fifth one-way clutch 84 is arranged between the hub axle 12 and the second sun gear 44. The second control part 85 is configured to control the fifth one-way clutch 84 to a connected state or a disconnected state.

When the fifth one-way clutch 84 is in the connected state as shown in FIG. 10, the second sun gear 44 is prohibited from rotating in a forward advancement direction as indicated with an arrow E. The fifth one-way clutch 84 includes a plurality of (e.g., two) fifth clutch pawls 86 and the first protrusions 28. The fifth clutch pawls 86 are mounted in fifth mounting recesses 44a that are formed in an internal circumferential surface of the second sun gear 44a such that the fifth clutch pawls 86 can pivot freely between an upright state and a prone state. The first protrusions 28 are formed on an external circumferential surface of the hub shaft 12 and mesh with the fifth clutch pawls 86. The fifth clutch pawls 86 are spring loaded toward an upright state in which they mesh with the first protrusions 28 by a fifth spring member 87. The fifth spring member 87 is made of an elastic wire-like material that is bent into a C-shape and mounted onto an internal circumferential surface of the second sun gear 44.

As seen in FIG. 7, the second control part 85 is formed by a pair of members each having a circular arc-shaped cross section. The second control part 85 is formed as an integral portion (one-piece) of the second cylindrical operating part 92. The second control part 85 is arranged in close proximity to a right side face (FIG. 2) of the first protrusions 28 of the hub axle 12. In response to turning of the second cylindrical operating part 92 about the hub axle 12, the second control part 85 turns between a connect position shown in FIG. 10 and a disconnect position shown in FIG. 11. When the second control part 85 is in the disconnect position, the fifth clutch pawls 86 are pushed into a prone orientation such that the fifth one-way clutch 84 is disconnected and the second sun gear 44 can rotate in a forward advancement direction.

As shown in FIGS. 2 and 7, the operating mechanism 70 includes a turning member 94, a return member 96, a first return spring 97 and a second return spring 98. The turning member 94 is configured and arranged to turn in coordination with the second cylindrical operating part 92. The return member 96 is configured and arranged to turn in coordination with the second cylindrical operating part 92.

The turning member 94 is a circular disk-shaped member that is made by press forming a metal plate-like material. The turning member 94 serves to turn the cam bearing member 81 in response to turning of the cable holding member 88. The turning member 94 has a main body section 94a, a pair of engaging pieces 94b, a pair of first engaging recesses 94c, a pair of second engaging recesses 94d and a pair of holding slots 94e. The main body section 94a is shaped generally like a washer, with the engaging pieces 94b being arranged on substantially opposite sides of an external circumference of the main body section 94a and bent over at 90-degree angles. The first and second engaging recesses 94c and 94d are formed in an internal circumferential surface of the main body section 94a. The first engaging recesses 94c engage the tip end portions 90d of the first connecting pieces 90b of the first cylindrical operating part 90. The second engaging recesses 94d engage the tip end portions 92b of the second connecting pieces 92a of the second cylindrical operating part 92. The holding slots 94e are formed in middle portions of the engaging pieces 94b. The holding slots 94e hold the cam bearing pins 81a of the cam bearing member 81 such that the cam bearing pins 81a can move freely in an axial direction of the hub. One of the engaging pieces 94b has a spring engaging hole 94f configured to engage with another end 98b of the second return spring 98.

The return member 96 is a circular disk-shaped member that is made by press forming a metal plate-like material. The return member 96 serves to transfer a spring force of the first return spring 97 to the first cylindrical operating part 90 and the second cylindrical operating part 92 such that the first cylindrical operating part 90 and the second cylindrical operating part 92 turn counterclockwise from the perspective of FIG. 7. The return member 96 has a pair of first engaging recesses 96a, a pair of second engaging recesses 96b and a spring engaging hole 96c. The first and second engaging recesses 96a and 96b are formed in an internal circumferential portion of the return member 96. The first engaging recesses 96a engage the tip end portions 90d of the first connecting pieces 90b of the first cylindrical operating part 90. The second engaging recesses 96b engage the tip end portions 92b of the second connecting pieces 92a of the second cylindrical operating part 92. The spring engaging hole 96c is formed in a side portion of the return member 96. The spring engaging hole 96c holds one end 97a (right end in FIG. 7) of the first return spring 97.

The first return spring 97 is, for example, a coil spring. The first return spring 97 acts as a return spring for the first cylindrical operating part 90 and the second cylindrical operating part 92. Thus, when a tension of the shift cable is released the first returns spring 97 causes the first cylindrical operating part 90, the second cylindrical operating part 92, and the cable holding member 88 to turn in a counterclockwise direction from the perspective of FIG. 7. As explained previously, one end 97a of the first return spring 97 is held by the return member 96 and the other end 97b is held by the second pawl support part 58, which is arranged non-rotatably with respect to the hub shaft 12.

The second return spring 98 is, for example, a coil spring. The second return spring 98 acts to cause the first cylindrical operating part 90 and the second cylindrical operating part 92 to move in a coordinated manner. More specifically, when the fourth one-way clutch 72 or the fifth one-way clutch 84 is in a state of transmitting power and cannot be changed (operated) to a disconnected state, the second return spring 98 serves to turn the second cylindrical operating part 92 after the power transmitting state is released. The second return spring 98 is arranged with one end 98a held by the first cylindrical operating part 90 and the other end held by the turning member 94. Rotation of the first cylindrical operating part 90 is transmitted to the second cylindrical operating cylinder 92 through the second return spring 98 and the turning member 94.

The manner in which the gear changing mechanism 20 operates in response to operation of the gear shifter will now be explained. When the cable holding member 88 is positioned into the high gear position by the gear shifter, the cam bearing member 81 of the first control part 73 separates from the fourth clutch pawls 77 of the fourth one-way clutch 72 in the first clutch mechanism 64. As a result, the fourth one-way clutch 72 is put into a connected state. At the same time, the third clutch pawls 74 of the third one-way clutch 54 are meshed with the opposite sides of the third ratchet teeth 75 as the fourth clutch pawls 77 and, therefore, the third one-way clutch 54 does not transmit rotation. As a result, rotation of the driver 16 in the forward advancement direction, as indicated with the arrow A in FIG. 4, is transmitted to the carrier 40 such that the carrier 40 rotates in the forward advancement direction as indicated with the arrow D in FIG. 4. As shown in FIG. 13, since the planetary gear mechanism 32 does not operate, the rotation of the driver 16 is transmitted directly (without torque multiplication) to the hub shell 14 through the carrier 40 and the connecting member 46. The resulting transmission path, i.e., a path in which rotation is transmitted from the driver 16 to the hub shell 14 through the carrier 40 and the connecting member 46, constitutes a first driver rotation transmission path 32a through which the driver 16 transmits rotation directly to the carrier 40 of the planetary gear mechanism 32 without using the torque multiplication function of the planetary gear mechanism 32.

When the cable holding member 88 is moved from the high gear position to the intermediate gear position by the gear shifter, the cable holding member 88 turns which causes the first cylindrical operating part 90 to turn counterclockwise from the perspective of FIG. 7. As a result, in the first clutch mechanism 64, the cam bearing member 81 of the first control part 73 turns clockwise from the perspective of FIG. 7 and moves leftward from the perspective of FIG. 2 so as to push the fourth clutch pawls 77 of the fourth one-way clutch 72 into a prone state. However, when a rider is pedaling the pedals 111, the cam bearing member 81 cannot press against the fourth clutch pawls 77 of the fourth one-way clutch 72 because the fourth clutch pawls 77 are in a state of transmitting power. Therefore, even if the first cylindrical operating part 90 rotates, the turning member 94 and the second cylindrical operating part 92 do not rotate, and the second return spring 98 flexes for storing a force. From this state, if the rider stops pedaling the pedals 111, then the spring force of the second return spring 98 will cause the turning member 94 and the second cylindrical operating part 92 to turn clockwise. As a result, the fourth one-way clutch 72 of the first clutch mechanism 64 enters a disconnected state and rotation of the driver 16 in the forward advancement direction is transmitted to the ring gear 34 through the first one-way clutch 50 such that the ring gear 34 rotates in the forward advancement direction as indicated by the arrow C in FIG. 4. The rotation of the ring gear 34 then operates the planetary gear mechanism 32.

When the cable holding member 88 is in the intermediate position, the second clutch mechanism 66 is in a connected state as shown in FIGS. 10 and 14. Consequently, the second sun gear 44 is prevented from rotating in a reverse direction, and does not rotate when the ring gear 34 rotates in a forward advancement direction. Thus, the speed of the rotation of the driver 16 is reduced according to a gear ratio determined by the meshing of the second planet gears 38 with the second sun gear 44 before the rotation is transmitted to the carrier 40 in the forward advancement direction. The rotation of the carrier 40 is transmitted to the hub shell 14 through the connecting member 46. As a result, the rotation of the hub shell 14 is reduced in comparison with the high gear position. Meanwhile, when a rider is not pedaling the pedals 111, the turning member 94 and the second cylindrical operating part 92 turn in coordination with the first cylindrical operating part 90.

The resulting transmission path (i.e., a path in which rotation is transmitted from the driver 16 to the carrier 40 through the second planet gears 38 and the second sun gear 44 such that the rotational speed of the carrier 40 is reduced in comparison with the high gear) constitutes the second driver rotation transmission path 32b shown in FIG. 14.

The first clutch mechanism 64 remains in a disconnected state when the cable holding member 88 is turned from the intermediate gear position to the low gear position by the gear shifter. Consequently, the ring gear 34 rotates in a forward advancement direction and the planetary gear mechanism 32 operates (is used).

Meanwhile, in the second clutch mechanism 66, the second control part 85 overlaps the first protrusions 28 of the hub axle 12 in a turning direction, as shown in FIGS. 11 and 15. Consequently, the fifth clutch pawls 86 cannot mesh with the first protrusions 28 and the second clutch mechanism 66 is in a disconnected state. Thus, the second sun gear 44 can rotate in either direction, and ceases to function as a sun gear. As a result, rotation of the driver 16 is reduced according to a gear ratio determined by the meshing of the first planet gears 36 with the first sun gear 42 before being transmitted to the carrier 40 in the forward advancement direction. The speed of the rotation transmitted to the carrier 40 is even more reduced with the low gear position than with the intermediate gear position because the first sun gear 42 has a larger number of teeth than the second sun gear 44. The rotation of the carrier 40 is transmitted to the hub shell 14 through the connecting member 46.

The resulting transmission path (i.e., a path in which rotation is transmitted from the driver 16 to the carrier 40 through the first planet gears 36 and the first sun gear 42 such that the rotational speed of the carrier 40 is reduced even further) constitutes the third driver rotation transmission path 32b shown in FIG. 15.

When the gear shifter is operated from the low gear position or the intermediate gear position in a direction of releasing tension in the shift cable, a spring force of the first return spring 97 is transmitted to the second cylindrical operating part 92 through the return member 96 and the second cylindrical operating cylinder 92 turns clockwise from the perspective of FIG. 7. In response, the first cylindrical operating part 90 and the rotating member 94 turn counterclockwise from the perspective of FIG. 7 and the gear changing mechanism 20 shifts toward a higher gear position.

When the bicycle is coasting without being pedaled (e.g., on a downward slope), rotation of the hub shell 14 in a forward advancement direction is transmitted to the carrier 40 through the connecting member 46 and the carrier 40 rotates in the forward advancement direction as indicated by the arrow D in FIG. 4, as shown in FIGS. 4 and 16. When the carrier 40 rotates in the forward advancement direction, the third clutch pawls 74 of the third one-way clutch 54 move clockwise inside the third mounting recesses 16c from the position shown in FIG. 4. The third clutch pawls 74 stop moving within the third mounting recesses 16c at a position indicated with a double-dot chain line when the third clutch pawls 74 contact a wall surface of the third mounting recesses 16c. As a result, rotation of the carrier 40 in the forward advancement direction is transmitted to the driver 16 and the driver 16 rotates integrally with the carrier 40 in the forward advancement direction.

The resulting transmission path (i.e., a path through which rotation in the forward advancement direction is transmitted from the hub shell 14 to the driver 16 through the carrier 40) constitutes the hub shell rotation transmission path 32d shown in FIG. 16.

As mentioned above, in this illustrate embodiment, the internally geared hub 10 is configured and arranged such that rotation is transmitted to the driver 16 in a forward advancement direction by a chain 110 when a pedal 111 is pedaled. The rotation of the driver 16 in the forward advancement direction is then transmitted to the hub shell 14 through a driver rotation transmission path selected by the gear changing mechanism 20 and the hub shell 14 rotates in the forward advancement direction. Meanwhile, when the pedals 111 are not pedaled and the bicycle is coasting, rotation is transmitted from the hub shell 14 to the driver 16 through the hub shell rotation transmission path 32d so long as the hub shell 14 is rotating faster than the driver 16 in the forward advancement direction. Since the internally geared hub 10 is provided with a hub shell rotation transmission path that transmits rotation of the hub shell 14 to the driver 16, the driver 16 rotates when the bicycle is coasting and such rotation of the driver 16 can be transmitted through the chain 110 so as to rotate a crankshaft or a member located peripherally with respect to the crankshaft. An electric motor can then be used to conduct regenerative charging by using the transmitted rotation of the crankshaft or the member peripheral to the crankshaft to drive the electric motor.

Also in this illustrate embodiment, the internally geared hub 10 is configured such that an output end part of the driver rotation transmission paths of the planetary gear mechanism 32 is connected to the hub shell 14 such that it can rotate integrally with the hub shell 14. Since the output end part of the driver rotation transmission paths (e.g., the first to third driver rotation transmission paths 32a to 32c) is connected to the hub shell 14 such that it can rotate integrally with the hub shell 14, the output end part of the driver rotation transmission paths can be used in the hub shell rotation transmission path 32d to transmit rotation from the hub shell 14 to the driver 16.

Preferably, in this illustrate embodiment of the internally geared hub 10, the output end part of the driver rotation transmission paths (e.g., the first to third driver rotation transmission paths 32a to 32c) of the planetary gear mechanism 32 is a carrier 40 of the planetary gear mechanism 32 and the carrier 40 is connected to the hub shell 14 such that it can rotate integrally with the hub shell 14. Since rotation is outputted from the carrier 40, which is connected to the hub shell 14 such that it can rotate integrally therewith, the hub shell rotation transmission path 32d can easily be configured and arranged to transmit rotation from the carrier 40 to the driver 16 and the structure of the hub shell rotation transmission path 32d can be simplified.

As mentioned above, in this illustrate embodiment of the internally geared hub 10, the planetary gear mechanism 32 includes the ring gear 34, the first sun gear 42, the second sun gear 44; the first planet gears 36, the second planet gear 38 and the carrier 40. The first sun gear 42 is arranged such that it can rotate about the hub axle 12. The second sun gear 44 is arranged such that it can rotate about the hub axle 12 and has a larger number of teeth than the first sun gear 42. The first planet gear 36 is arranged and configured to mesh with the ring gear 34 and the first sun gear 42. The second planet gear 38 is arranged and configured to mesh with the second sun gear 44 and to be able to rotate integrally with the first planet gear 36. The carrier 40 is connected to the hub shell 14 such that it can rotate integrally therewith, configured to rotatably support the first planet gear 36 and the second planet gear 38, and arranged such that it can rotate freely about the hub axle 12.

Thus, the hub shell 16 can be rotated at any one of three different rotational speeds by the planetary gear mechanism 32, i.e., at the same rotational speed as the driver 16 or at either of two other rotational speeds that are different from the rotational speed of the driver 16. Also, since the driver 16 can be driven directly by the carrier 40, the structure of the hub shell rotation transmission path 32d can be simplified.

In this illustrate embodiment of the internally geared hub 10, the driver rotation transmission paths (e.g., the first to third driver rotation transmission paths 32a to 32c) are provided with the first one-way clutch 50 for transmitting rotation from the driver 16 to the ring gear 34 only in a forward advancement direction, and the second one-way clutch 52 for preventing rotation of the first sun gear 42 only in a direction opposite the forward advancement direction. Thus, two different rotational speeds (gear ratios) can be obtained with driver rotation transmission paths (e.g., the first to third driver rotation transmission paths 32a and 32c) in which rotation is transmitted from the driver 16 to the ring gear 34 by means of the first one-way clutch 50.

In the internally geared hub 10, the hub shell rotation transmission path 32d is provided with the third one-way clutch 54 for transmitting rotation from the carrier 40 to the driver 16 in the operating direction, and the first one-way clutch state changing section 51 for putting the first one-way clutch 50 into a disconnected state when the hub shell 14 rotates in the operating direction. Thus, the driver 16 does not lock when rotation is transmitted from the carrier 40 to the driver 16 through the hub shell rotation transmission path 32d because rotation is not permitted to be transmitted from the ring gear 34.

(In the internally geared hub 10, the first one-way clutch 50 has the first clutch pawl 55 attached to an external circumferential surface of the driver 16 such that it can pivot between an upright orientation and a prone orientation, the first ratchet teeth 56 provided on an internal circumferential surface of the ring gear 34 and arranged such that it can contact a tip end of the first clutch pawl 55, and the first spring member 57 arranged to apply a force against the first clutch pawl 55 in a direction of standing the first clutch pawl 55 upright. Additionally, the one-way clutch state changing section 51 has the clutch pawl state changing part 47 mounted on an external circumferential surface of the driver 16 such that it can turn in a rotational direction between a first and second positions to enable the first clutch pawl 55 to be upright when in the first position and to cause the first clutch pawl 55 to be prone when in the second position. The one-way clutch state changing section 51 also has the moving mechanism 48 configured and arranged to move the clutch pawl state changing part 47 from the first position to the second position in response to rotation of the carrier 40 in the operating direction. Thus, the first one-way clutch 50 can be put into a disconnected state by the clutch pawl state changing part 47 when the carrier 40 is rotated by rotation transmitted from the hub shell 14.

In the internally geared hub 10, the gear changing mechanism 20 the first clutch mechanism 64 switches the driver 16 and the carrier 40 between a connected state and a disconnected state in response to a movement of the movable member 63. The second clutch mechanism 66 switches the second sun gear 44 between a state in which it can rotate in the forward advancement direction and a state in which it cannot rotate in the forward advancement direction in response to a movement of the movable member 63. The operating mechanism 70 operates the first clutch mechanism 64 and the second clutch mechanism 66 in response to a movement of the movable member 63. Thus, when the carrier 40 is connected to the driver 16 by the first clutch mechanism 64, the rotation of the driver 16 is transmitted directly to the carrier 40 and from the carrier 40 to the hub shell 14 without any torque multiplication. Conversely, when the first clutch mechanism 64 is disconnected, a rotation of the driver 16 is transmitted through the ring gear 34. Thus, if the second clutch mechanism 66 is in the non-rotatable state, then the rotational speed is reduced by a reduction ratio (gear ratio) resulting from meshing of the second sun gear 44 with the second planet gear 38 before the rotation is transmitted to the hub shell 14. Meanwhile, if the second clutch mechanism 66 is in the rotatable state, then the speed of the rotation is reduced by a reduction ratio resulting from meshing of the first sun gear 42 with the first planet gear 36. Since the first driver rotation transmission path 32a drives the hub shell 14 directly, and is a high gear that is used frequently, the service life of the internally geared hub 10 is improved.

While only selected embodiments have been chosen to illustrate the present invention, it will be apparent to those skilled in the art from this disclosure that various changes and modifications can be made herein without departing from the scope of the invention as defined in the appended claims.

For example, although in the previously described embodiment the internally geared hub is configured such that the cable holding member 88, the first cylindrical operating part, and the second cylindrical operating part turn about the hub axle, the present invention is not limited to such a configuration. For example, the invention can also be applied to an internally geared hub having a bell crank and a push rod configured and arranged to be moved in an axial direction of the hub by the bell crank.

Although in the previously described embodiment the second clutch mechanism 66 is configured and arranged to switch the second sun gear 44 between an operable state and a non operable state, it is acceptable to configure the hub such that the second clutch mechanism switches the first sun gear between an operable state and a non operable state.

Although in the previously described embodiment the internally geared hub 10 is a three-speed hub, the number of gears (speeds) provided in the internally geared hub is not limited to three.

Although in the previously described embodiment the internally geared hub 10 is operated with a manual gear shifter, the present invention can also be applied to an internally geared hub configured and arranged to be driven by a motor or other actuator controlled with an electric gear shifter having an electric switch or other electric control mechanism.

Although in the previously described embodiment a first one-way clutch 50 is provided in the hub shell rotation transmission path 32d to match the rotational directions of the hub shell 14 and the driver 16, it is also acceptable to form a ring gear on an internal circumferential surface of the driver. In such a case, a fourth one-way clutch would be unnecessary and rotation of the hub shell would be transmitted to the driver in the opposite direction at an increased rotational speed.

Thus, the foregoing descriptions of the embodiments according to the present invention are provided for illustration only, and not for the purpose of limiting the invention as defined by the appended claims and their equivalents.

What is claimed is:
1. An internally geared hub comprising:
a hub axle;
a hub shell arranged to rotate freely about the hub axle;

a driver rotatably mounted between the hub axle and the hub shell such that the driver rotates freely relative to both the hub axle and the hub shell;

a planetary gear mechanism operatively connected between the hub shell and the driver, the planetary gear mechanism including a plurality of driver rotation transmission paths that transmits rotation of the driver in a prescribed operating direction to the hub shell, and a hub shell rotation transmission path that transmits rotation of the hub shell in the prescribed operating direction to the driver; and a gear changing mechanism operatively connected to the planetary gear mechanism for selectively establishing one of the driver rotation transmission paths or the hub shell rotation transmission path.

2. The internally geared hub as recited in claim 1, wherein the planetary gear mechanism includes an output end part that is fixedly connected to the hub shell such that the output end part rotates integrally with the hub shell.

3. The internally geared hub as recited in claim 2, wherein the output end part of the planetary gear mechanism is a carrier of the planetary gear mechanism.

4. The internally geared hub as recited in claim 1, wherein the planetary gear mechanism includes a ring gear arranged around an external circumference of the driver, a first sun gear rotatably mounted around the hub axle, a second sun gear rotatably mounted around the hub axle, at least one first planet gear engaged with the ring gear and the first sun gear, at least one second planet gear engaged with the second sun gear, and a carrier rotatably supporting the first and second planet gears, the carrier is fixedly connected to the hub shell as an output end part of the planetary gear mechanism such that the carrier rotates integrally with the hub shell about the hub axle, the second sun gear has a larger number of teeth than the first sun gear.

5. The internally geared hub as recited in claim 4, further comprising a first one-way clutch that transmits rotation from the driver to the ring gear only in the prescribed operating direction; and a second one-way clutch that prevents rotation of the first sun gear only in a direction opposite the prescribed operating direction, with the first and second one-way clutches being operatively disposed in the driver rotation transmission paths.

6. The internally geared hub as recited in claim 5, further comprising a third one-way clutch that transmits rotation from the carrier to the driver in the prescribed operating direction during operation of the planetary gear mechanism along the hub shell rotation transmission path; and a first one-way clutch state changing section that puts the first one-way clutch into a disconnected state when the hub shell rotates in the prescribed operating direction.

7. The internally geared hub as recited in claim 6, wherein the first one-way clutch includes a clutch pawl, a plurality of ratchet teeth and a force applying member, with the clutch pawl being pivotally attached to an external circumferential surface of the driver to move between an upright orientation and a prone orientation, the ratchet teeth being provided on an internal circumferential surface of the ring gear, and the force applying member biasing force the clutch pawl to the upright orientation such that a tip end of the clutch pawl is engaged with the ratchet teeth; and the first one-way clutch state changing section includes a clutch pawl state changing part and a moving mechanism, with the clutch pawl state changing part being pivotally mounted on the external circumferential surface of the driver in a rotational direction between first and second positions that are separated from each other, with the moving mechanism moving the clutch pawl state changing part from the first position to the second position in response to rotation of the carrier in the prescribed operating direction such that the clutch pawl is in the upright orientation while the clutch pawl state changing part is in the first position and such that the clutch pawl is in the prone orientation when in the second position.

8. The internally geared hub as recited in claim 5, wherein the gear changing mechanism includes a movable member, a first clutch mechanism, a second clutch mechanism and an operating mechanism, with the operating mechanism operating the first clutch mechanism and the second clutch mechanism in response to a movement of the movable member, the first clutch mechanism switching the driver and the carrier between a connected state and a disconnected state in response to the movement of the movable member, and the second clutch mechanism switching the second sun gear between a first state in which it can rotate in the prescribed operating direction and a second state in which it cannot rotate in the prescribed operating direction in response to the movement of the movable member.

9. The internally geared hub as recited in claim 6, wherein the gear changing mechanism includes a movable member, a first clutch mechanism, a second clutch mechanism and an operating mechanism, with the operating mechanism operating the first clutch mechanism and the second clutch mechanism in response to a movement of the movable member, the first clutch mechanism switching the driver and the carrier between a connected state and a disconnected state in response to the movement of the movable member, and the second clutch mechanism switching the second sun gear between a first state in which it can rotate in the prescribed operating direction and a second state in which it cannot rotate in the prescribed operating direction in response to the movement of the movable member.

10. The internally geared hub as recited in claim 7, wherein the gear changing mechanism includes a movable member, a first clutch mechanism, a second clutch mechanism and an operating mechanism, with the operating mechanism operating the first clutch mechanism and the second clutch mechanism in response to a movement of the movable member, the first clutch mechanism switching the driver and the carrier between a connected state and a disconnected state in response to the movement of the movable member, and the second clutch mechanism switching the second sun gear between a first state in which it can rotate in the prescribed operating direction and a second state in which it cannot rotate in the prescribed operating direction in response to the movement of the movable member.

11. The internally geared hub as recited in claim 1, wherein the planetary gear mechanism includes a ring gear, a first sun gear, a second sun gear, at least one first planet gear engaged with the ring gear and the first sun gear, at least one second planet gear engaged with the second sun gear, and a carrier rotatably supporting the first and second planet gears, the internally geared hub further comprising a first one-way clutch that transmits rotation from the driver to the ring gear only in the prescribed operating direction;

a second one-way clutch that prevents rotation of the first sun gear only in a direction opposite the prescribed operating direction, with the first and second one-way clutches being operatively disposed in the driver rotation transmission paths;

a third one-way clutch that transmits rotation front the carrier to the driver in the prescribed operating direction during operation of the planetary gear mechanism along the hub shell rotation transmission path; and a first one-way clutch state changing section that puts the first one-way clutch into a disconnected state when the hub shell rotates in the prescribed operating direction.

12. The internally geared hub as recited in claim 11, wherein the first one-way clutch includes a clutch pawl, a plurality of ratchet teeth and a force applying member, with the clutch pawl being pivotally attached to an external circumferential surface of the driver to move between an upright orientation and a prone orientation, the ratchet teeth being provided on an internal circumferential surface of the ring gear, and the force applying member biasing force the clutch pawl to the upright orientation such that a tip end of the clutch pawl is engaged with the ratchet teeth; and the first one-way clutch state changing section includes a clutch pawl state changing part and a moving mechanism, with the clutch pawl state changing part being pivotally mounted on the external circumferential surface of the driver in a rotational direction between first and second positions that are separated from each other, with the moving mechanism moving the clutch pawl state changing part from the first position to the second position in response to rotation of the carrier in the prescribed operating direction such that the clutch pawl is in the upright orientation while the clutch pawl state changing part is in the first position and such that the clutch pawl is in the prone orientation when in the second position.

13. The internally geared hub as recited in claim 11, wherein the gear changing mechanism includes a movable member, a first clutch mechanism, a second clutch mechanism and an operating mechanism, with the operating mechanism, operating the first clutch mechanism and the second clutch mechanism in response to a movement of the movable member, the first clutch mechanism switching the driver and the carrier between a connected state and a disconnected state in response to the movement of the movable member, and the second clutch mechanism switching the second sun gear between a first state in which it can rotate in the prescribed operating direction and a second state in which it cannot rotate in the prescribed operating direction in response to the movement of the movable member.

* * * * *